United States Patent
Lo et al.

(10) Patent No.: US 12,047,951 B2
(45) Date of Patent: Jul. 23, 2024

(54) METHOD AND APPARATUS FOR TRANSMITTING AND RECEIVING DOWNLINK CONTROL CHANNEL IN A WIRELESS COMMUNICATION SYSTEM

(71) Applicant: ASUSTek Computer Inc., Taipei (TW)

(72) Inventors: Hsin-Yuan Lo, Taipei (TW); Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 361 days.

(21) Appl. No.: 17/583,901

(22) Filed: Jan. 25, 2022

(65) Prior Publication Data
US 2022/0256571 A1    Aug. 11, 2022

Related U.S. Application Data

(60) Provisional application No. 63/219,268, filed on Jul. 7, 2021, provisional application No. 63/185,404, filed (Continued)

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0004* (2013.01); *H04W 24/08* (2013.01); *H04W 72/23* (2023.01)

(58) Field of Classification Search
CPC ............. H04W 72/1273; H04W 72/23; H04W 24/08; H04L 1/0004
See application file for complete search history.

(56) References Cited

U.S. PATENT DOCUMENTS

| | | | |
|---|---|---|---|
| 2016/0219607 A1* | 7/2016 | You | H04W 72/12 |
| 2021/0105747 A1* | 4/2021 | Dimou | H04L 5/0094 |
| 2021/0136802 A1* | 5/2021 | Cirik | H04B 7/0695 |

OTHER PUBLICATIONS

Moderator (LG Electronics), "Sumary of [101-e-NR-L1enh-URLLC-lloTenh-01]", Agenda Item 7.2.5.7, R1-200xxx, Discussion and decision, 3GPP TSG-RAN WG1 Meeting #101-e, e-Meeting, May 25-Jun. 5, 2020.
(Continued)

*Primary Examiner* — Duc C Ho
(74) *Attorney, Agent, or Firm* — Blue Capital Law Firm, P.C.

(57) ABSTRACT

A method and apparatus are disclosed from the perspective of a network. In one embodiment, the method includes the network transmitting a Semi-Persistent Scheduling (SPS) configuration to a User Equipment (UE) for configuring a second Physical Downlink Shared Channel (PDSCH). The method also includes the network transmitting a configuration to the UE for configuring a first monitoring occasion for a first Physical Downlink Control Channel (PDCCH) and a second monitoring occasion for a second PDCCH, wherein the second PDCCH is associated with the first PDCCH. The method further includes the network not allowing the first PDCCH and the second PDCCH to schedule the UE with a first PDSCH partially or fully overlapping with the second PDSCH in time domain, wherein a last symbol of a later monitoring occasion among the first and the second monitoring occasion ends less than a processing threshold before a starting symbol of the second PDSCH.

20 Claims, 23 Drawing Sheets

Related U.S. Application Data on May 7, 2021, provisional application No. 63/146,996, filed on Feb. 8, 2021.

(51) Int. Cl.
  *H04W 24/08* (2009.01)
  *H04W 72/23* (2023.01)

(56) References Cited

OTHER PUBLICATIONS

Moderator (LG Electronics), "Summary on maintenance of other aspects for URLLC/IIOT", Agenda Item 7.2.5.7, R1-200xxxx, Discussion and decision, 3GPP TSG RAN WG1 #102-e, e-Meeting, Aug. 17-28, 2020.

* cited by examiner

| Value of the Redundancy version field | Value of $rv_{id}$ to be applied |
|---|---|
| 0 | 0 |
| 1 | 3 |

FIG. 5 (PRIOR ART)

| CCE Aggregation Level | Number of Candidates |
|---|---|
| 4 | 4 |
| 8 | 2 |
| 16 | 1 |

FIG. 6 (PRIOR ART)

| MO2 | MO2' | |
|---|---|---|
| Y | Y | 1. Real<br>2. Virtual |
| Y | N | 1. Real<br>2. Virtual |
| N | Y | 1. Virtual/(Real)<br>2. Virtual |
| N | N | 1. Virtual<br>2. Virtual |

METHOD AND APPARATUS FOR TRANSMITTING AND RECEIVING DOWNLINK CONTROL CHANNEL IN A WIRELESS COMMUNICATION SYSTEM

CROSS-REFERENCE TO RELATED APPLICATIONS

The present application claims the benefit of U.S. Provisional Patent Application Ser. No. 63/146,996 filed on Feb. 8, 2021, U.S. Provisional Patent Application Ser. No. 63/185,404 filed on May 7, 2021, U.S. Provisional Patent Application Ser. No. 63/219,268 filed on Jul. 7, 2021, the entire disclosures of which are incorporated herein in their entirety by reference.

FIELD

This disclosure generally relates to wireless communication networks, and more particularly, to a method and apparatus for transmitting and receiving downlink control channel in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network. In one embodiment, the method includes the network transmitting a Semi-Persistent Scheduling (SPS) configuration to a User Equipment (UE) for configuring a second Physical Downlink Shared Channel (PDSCH). The method also includes the network transmitting a configuration to the UE for configuring a first monitoring occasion for a first Physical Downlink Control Channel (PDCCH) and a second monitoring occasion for a second PDCCH, wherein the second PDCCH is associated with the first PDCCH. The method further includes the network not allowing the first PDCCH and the second PDCCH to schedule the UE with a first PDSCH partially or fully overlapping with the second PDSCH in time domain, wherein a last symbol of a later monitoring occasion among the first and the second monitoring occasion ends less than a processing threshold before a starting symbol of the second PDSCH.

Furthermore, a method and apparatus are disclosed from the perspective of a UE. In one embodiment, the method includes the UE triggering a Power Headroom Reporting (PHR), wherein the UE generates a PHR Medium Access Control (MAC) Control Element (CE) in response to the triggered PHR. The method also includes the UE detecting a first Downlink Control Information (DCI) from a first cell since the triggered PHR, wherein the first DCI is associated to first two Physical Downlink Control Channel (PDCCH) monitoring occasions with different ending symbol, and an earlier PDCCH monitoring occasion among the first two PDCCH monitoring occasions is the earliest PDCCH monitoring occasion scheduling an initial first PUSCH since the triggered PHR. The method further includes the UE detecting a second DCI from a second cell since the triggered PHR, wherein the second DCI is associated to second two PDCCH monitoring occasions with different ending symbols, and the second DCI schedules a second Physical Uplink Shared Channel (PUSCH), on the second cell, in a second slot overlapping with a first slot for transmitting the initial first PUSCH. In addition, the method includes the UE determining whether a power headroom for the second serving cell is real or virtual based on at least a later PDCCH monitoring occasion among the first two PDCCH monitoring occasions. Furthermore, the method includes the UE transmitting the PHR MAC CE to the network, wherein the PHR MAC CE at least comprises information of the power headroom (PH) for the second serving cell.

In addition, a method and apparatus are disclosed from the perspective of a UE. In one embodiment, the method includes the UE receiving an indication of Uplink Cancelation Indication (ULCI) by detecting first group common Physical Downlink Control Channel (PDCCH) and second group common PDCCH in PDCCH repetition on a first cell, wherein the first PDCCH and the second PDCCH ends in different symbol, the first PDCCH and the second PDCCH are in one slot, and the indication of ULCI corresponds to at least the first cell and the second cell. The method also includes the UE receiving a third PDCCH scheduling an Uplink (UL) transmission on a second cell, wherein the third PDCCH ends between the first PDCCH and second PDCCH. The method further includes the UE determining whether the indication of ULCI is applicable to the UL transmission based on at least whether the third PDCCH ends earlier than first symbol of earlier PDCCH among the first and the second PDCCH. In addition, the method includes the UE performing the UL transmission in response to the determination that the indication of ULCI is not applicable to the UL transmission.

BRIEF DESCRIPTION OF THE DRAWINGS

FIG. 5 is a reproduction of Table 7.3.1.2.3-1 of 3GPP TS 38.212 V16.3.0.

FIG. 6 is a reproduction of Table 10.1-1 of 3GPP TS 38.213 V16.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: RP-202024, "Revised WID: Further enhancements on MIMO for NR", Samsung; TS 38.212 V16.2.0, "NR Multiplexing and channel coding (Release 16)"; TS 38.213 V16.3.0, "NR Physical layer procedures for control (Release 16)"; TS 38.213 V16.4.0, "NR Physical layer procedures for control (Release 16)"; TS 38.214 V16.3.0, "NR Physical layer procedures for data (Release 16)"; TS 38.321 V16.3.0, "NR; Medium Access Control (MAC) protocol specification (Release 16)"; and 3GPP TSG RAN WG1 Meeting #102-e, Aug. 17-28, 2020, RAN1 Chairman's Notes. The standards and documents listed above are hereby expressly incorporated by reference in their entirety.

Figure 1:
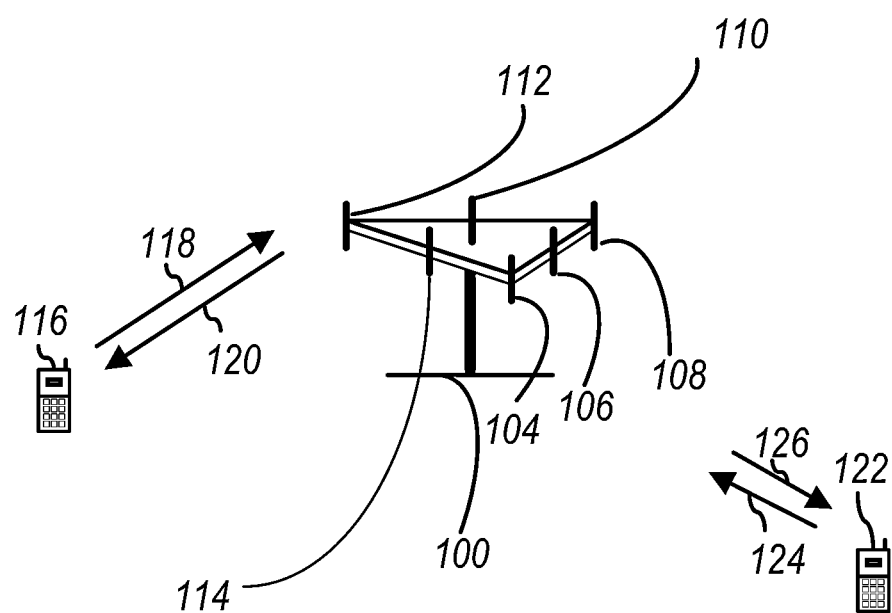
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
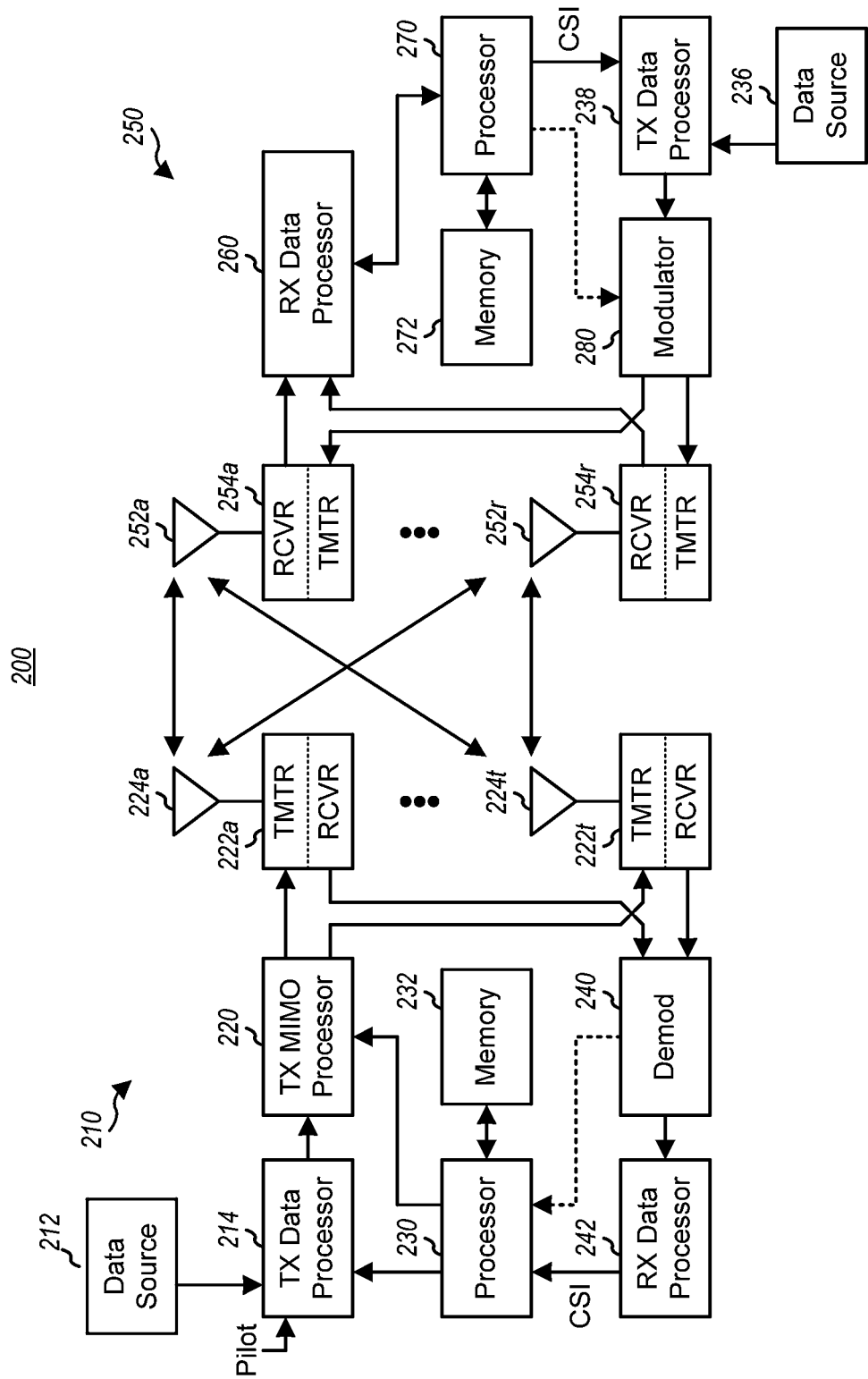
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
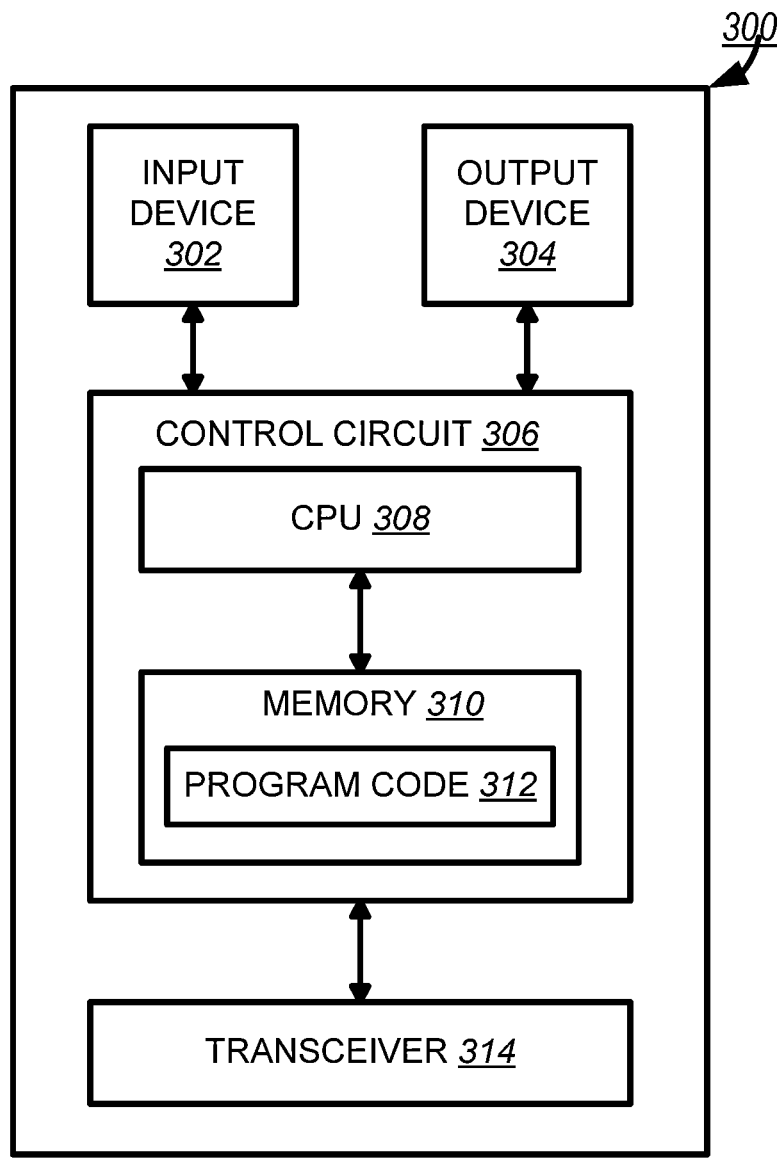
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
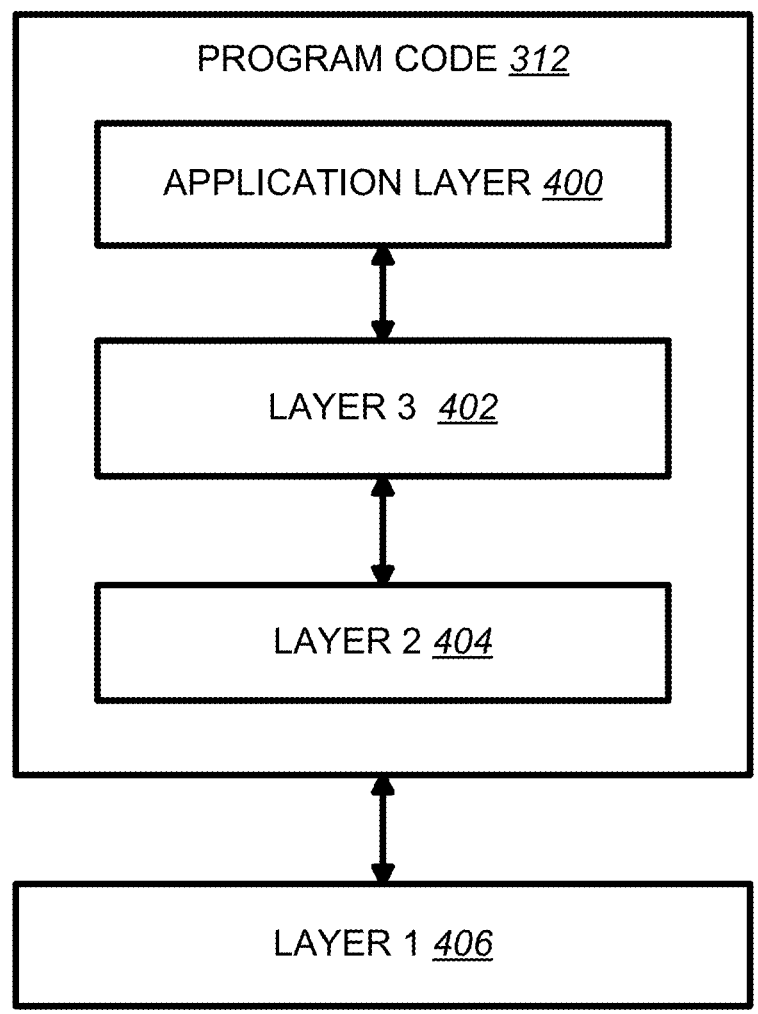
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP RP-202024 specifies the justification and objective of work item on further enhancement on Multiple Input Multiple Output (MIMO) for NR as follows:

3 Justification

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage.

4 Objective 4.1 Objective of SI or Core Part WI or Testing Part WI

The work item aims to specify the further enhancements identified for NR MIMO. The detailed objectives are as follows:
Extend specification support in the following areas [RAN1]
Enhancement on the support for multi-TRP deployment, targeting both FR1 and FR2:
a. Identify and specify features to improve reliability and robustness for channels other than PDSCH (that is, PDCCH, PUSCH, and PUCCH) using multi-TRP and/or multi-panel, with Rel.16 reliability features as the baseline 3GPP TS 38.212 V16.3.0 describes the downlink transport channels and downlink control information for scheduling the physical downlink shared channel as follows:

7.3.1.2 DCI Formats for Scheduling of PDSCH 7.3.1.2.1 Format 1_0

DCI format 1_0 is used for the scheduling of PDSCH in one DL cell.

The following information is transmitted by means of the DCI format 1_0 with CRC scrambled by C-RNTI or CS-RNTI or MCS-C-RNTI:
Identifier for DCI formats—1 bits
The value of this bit field is always set to 1, indicating a DL DCI format
Frequency domain resource assignment—$\lceil \log_2(N_{RB}^{DL,BPW}(N_{RB}^{DL,BWP}+1)/2) \rceil$ bits where $N_{RB}^{DL,BWP}$ is given by clause 7.3.1.0
If the CRC of the DCI format 1_0 is scrambled by C-RNTI and the "Frequency domain resource assignment"

field are of all ones, the DCI format 1_0 is for random access procedure initiated by a PDCCH order, with all remaining fields set as follows:
- Random Access Preamble index [ . . . ]
- UL/SUL indicator [ . . . ]
- SS/PBCH index [ . . . ]
- PRACH Mask index [ . . . ]
- Reserved bits [ . . . ]

Otherwise, all remaining fields are set as follows:
- Time domain resource assignment—4 bits as defined in Clause 5.1.2.1 of [6, TS 38.214]
- VRB-to-PRB mapping—1 bit according to Table 7.3.1.2.2-5
- Modulation and coding scheme—5 bits as defined in Clause 5.1.3 of [6, TS 38.214]
- New data indicator—1 bit
- Redundancy version—2 bits as defined in Table 7.3.1.1.1-2
- HARQ process number—4 bits
- PUCCH resource indicator—3 bits as defined in Clause 9.2.3 of [5, TS 38.213]
- PDSCH-to-HARQ_feedback timing indicator—3 bits as defined in Clause 9.2.3 of [5, TS38.213]

7.3.1.2.2 Format 1_1

DCI format 1_1 is used for the scheduling of PDSCH in one cell.

The following information is transmitted by means of the DCI format 1_1 with CRC scrambled by C-RNTI or CS-RNTI or MCS-C-RNTI:
- Identifier for DCI formats—1 bits
  The value of this bit field is always set to 1, indicating a DL DCI format
- Carrier indicator—0 or 3 bits as defined in Clause 10.1 of [5, TS 38.213].
- Bandwidth part indicator [ . . . ]
- Frequency domain resource assignment [ . . . ]
- Time domain resource assignment—0, 1, 2, 3, or 4 bits as defined in Clause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
- For transport block 1:
- Modulation and coding scheme—5 bits as defined in Clause 5.1.3.1 of [6, TS 38.214]
- New data indicator—1 bit
- Redundancy version—2 bits as defined in Table 7.3.1.1.1-2
- For transport block 2 (only present if maxNrofCodeWordsScheduledByDCI equals 2):
- Modulation and coding scheme—5 bits as defined in Clause 5.1.3.1 of [6, TS 38.214]
- New data indicator—1 bit
- Redundancy version—2 bits as defined in Table 7.3.1.1.1-2
- HARQ process number—4 bits
- Downlink assignment index [ . . . ]
- PUCCH resource indicator—3 bits as defined in Clause 9.2.3 of [5, TS 38.213]
- PDSCH-to-HARQ_feedback timing indicator—0, 1, 2, or 3 bits as defined in Clause 9.2.3 of [5, TS 38.213]. The bitwidth for this field is determined as $\lceil \log_2(I) \rceil$ bits, where I is the number of entries in the higher layer parameter dl-DataToUL-ACK.
- Antenna port(s)—4, 5, or 6 bits as defined by Tables 7.3.1.2.2-1/2/3/4 and Tables 7.3.1.2.2-1A/2A/3A/4A, where the number of CDM groups without data of values 1, 2, and 3 refers to CDM groups {0}, {0,1}, and {0, 1, 2} respectively. The antenna ports $\{p_0, \ldots, p_{v-1}\}$ shall be determined according to the ordering of DMRS port(s) given by Tables 7.3.1.2.2-1/2/3/4 or Tables 7.3.1.2.2-1A/2A/3A/4A. When a UE receives an activation command that maps at least one codepoint of DCI field 'Transmission Configuration Indication' to two TCI states, the UE shall use Table 7.3.1.2.2-1A/2A/3A/4A; otherwise, it shall use Tables 7.3.1.2.2-1/2/3/4. The UE can receive an entry with DMRS ports equals to 1000, 1002, 1003 when two TCI states are indicated in a codepoint of DCI field 'Transmission Configuration Indication' [and subject to UE capability].
- Transmission configuration indication –0 bit if higher layer parameter tci-PresentInDCI is not enabled; otherwise 3 bits as defined in Clause 5.1.5 of [6, TS38.214].

If DCI formats 1_1 are monitored in multiple search spaces associated with multiple CORESETs in a BWP for scheduling the same serving cell, zeros shall be appended until the payload size of the DCI formats 1_1 monitored in the multiple search spaces equal to the maximum payload size of the DCI format 1_1 monitored in the multiple search spaces.

7.3.1.2.3 Format 1_2

DCI format 1_2 is used for the scheduling of PDSCH in one cell.

The following information is transmitted by means of the DCI format 1_2 with CRC scrambled by C-RNTI or CS-RNTI or MCS-C-RNTI:
- Identifier for DCI formats—1 bits
  The value of this bit field is always set to 1, indicating a DL DCI format.
- Carrier indicator—0, 1, 2 or 3 bits determined by higher layer parameter carrierIndicatorSizeForDCI-Format1-2, as defined in Clause 10.1 of [5, TS38.213].
- Bandwidth part indicator [ . . . ]
- Frequency domain resource assignment [ . . . ]
- Time domain resource assignment—0, 1, 2, 3, or 4 bits as defined in Clause 5.1.2.1 of [6, TS 38.214]. The bitwidth for this field is determined as $\lceil \log_2(I) \rceil$ bits, where I is the number of entries in the higher layer parameter pdsch-TimeDomainAllocationListForDCI-Format1-2 if the higher layer parameter is configured, or I is the number of entries in the higher layer parameter pdsch-TimeDomainAllocationList if the higher layer parameter pdsch-TimeDomainAllocationList is configured when the higher layer parameter pdsch-TimeDomainAllocationListForDCI-Format1-2 is not configured; otherwise I is the number of entries in the default table.
- Modulation and coding scheme—5 bits as defined in Clause 5.1.3.1 of [6, TS 38.214]
- New data indicator—1 bit
- Redundancy version [ . . . ]
- HARQ process number—0, 1, 2, 3 or 4 bits determined by higher layer parameter harq-ProcessNumberSizeForDCI-Format1-2
- Downlink assignment index—0, 1, 2 or 4 bits PUCCH resource indicator—0 or 1 or 2 or 3 bits determined by higher layer parameter numberOfBitsFor-PUCCH-ResourceIndicatorForDCI-Format1-2

PDSCH-to-HARQ_feedback timing indicator—0, 1, 2, or 3 bits as defined in Clause 9.2.3 of [5, TS 38.213]. The bitwidth for this field is determined as $\lceil \log_2 (I) \rceil$ bits, where I is the number of entries in the higher layer parameter dl-DataToUL-ACK-ForDCI-Format1-2.

Antenna port(s) [ . . . ]

Transmission configuration indication—0 bit if higher layer parameter tci-PresentForDCI-Format1-2 is not enabled; otherwise 1 or 2 or 3 bits determined by higher layer parameter tci-PresentForDCI-Format1-2 as defined in Clause 5.1.5 of [6, TS38.214].

If DCI formats 1_2 are monitored in multiple search spaces associated with multiple CORESETs in a BWP for scheduling the same serving cell, zeros shall be appended until the payload size of the DCI formats 1_2 monitored in the multiple search spaces equal to the maximum payload size of the DCI format 1_2 monitored in the multiple search spaces.

Table 7.3.1.2.3-1 of 3GPP TS 38.212 V16.3.0, Entitled "Redundancy Version", is Reproduced as FIG. 5

3GPP TS 38.213 V16.2.0 specifies the physical layer for control, which includes random access procedure, cell search procedure and Physical Downlink Control Channel (PDCCH) monitoring as follows:

7.7 Power Headroom Report

The types of UE power headroom reports are the following. A Type 1 UE power headroom PH that is valid for PUSCH transmission occasion i on active UL BWP b of carrier f of serving cell c. A Type 3 UE power headroom PH that is valid for SRS transmission occasion i on active UL BWP b of carrier f of serving cell c.

A UE determines whether a power headroom report for an activated serving cell [11, TS 38.321] is based on an actual transmission or a reference format based on the higher layer signalling of configured grant and periodic/semi-persistent sounding reference signal transmissions and downlink control information the UE received until and including the PDCCH monitoring occasion where the UE detects the first DCI format scheduling an initial transmission of a transport block since a power headroom report was triggered if the power headroom report is reported on a PUSCH triggered by the first DCI format.

Otherwise, a UE determines whether a power headroom report is based on an actual transmission or a reference format based on the higher layer signalling of configured grant and periodic/semi-persistent sounding reference signal transmissions and downlink control information the UE received until the first uplink symbol of a configured PUSCH transmission minus $T'_{proc,2} = T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the power headroom report is reported on the PUSCH using the configured grant.

7.7.1 Type 1 PH Report

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as $$PH_{type1,b,f,c}(i,j,q_d,l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} \quad [\text{dB}]$$

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q)$, $\Delta_{TF,b,f,c}(i)$ and $f_{b,f,c}(i, l)$ are defined in Clause 7.1.1.

If a UE is configured with multiple cells for PUSCH transmissions, where a SCS configuration $\mu_1$ on active UL BWP $b_1$ of carrier fj of serving cell $C_1$ is smaller than a SCS configuration $\mu_2$ on active UL BWP $b_2$ of carrier $f_2$ of serving cell $C_2$, and if the UE provides a Type 1 power headroom report in a PUSCH transmission in a slot on active UL BWP b, that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$.

If a UE is configured with multiple cells for PUSCH transmissions, where a same SCS configuration on active UL BWP $b_1$ of carrier fj of serving cell $C_1$ and active UL BWP $b_2$ of carrier $f_2$ of serving cell $C_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

If a UE is configured with multiple cells for PUSCH transmissions and provides a Type 1 power headroom report in a PUSCH transmission with PUSCH repetition Type B having a nominal repetition that spans multiple slots on active UL BWP $b_1$ and overlaps with one or more slots on active UL BWP $b_2$, the UE provides a Type 1 power headroom report for the first PUSCH, if any, on the first slot of the one or more slots on active UL BWP $b_2$ that overlaps with the multiple slots of the nominal repetition on active UL BWP $b_1$.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $C_1$, a second PUSCH transmission on active UL BWP $b_2$ of carrier $f_2$ of serving cell $C_2$ that overlaps with the first PUSCH transmission if
- the second PUSCH transmission is scheduled by a DCI format in a PDCCH received in a second PDCCH monitoring occasion, and
- the second PDCCH monitoring occasion is after a first PDCCH monitoring occasion where the UE detects the earliest DCI format scheduling an initial transmission of a transport block after a power headroom report was triggered or
- the second PUSCH transmission is after the first uplink symbol of the first PUSCH transmission minus $T'_{proc,2} = T_{proc,2}$ where $T_{proc,2}$ is determined according to [6, TS 38.214] assuming $d_{2,1}=1$, $d_{2,2}=0$, and with pa corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l) = \tilde{P}_{CMAX,f,c}(i) - \{P_{O\_PUSCH,b,f,c}(j) \cdot PL_{b,f,c}(q_d) + f_{b,f,c}(i,l)\} \quad [dB]$$

where $\tilde{P}_{CMAX,f,c}(i)$ is computed assuming MPR=0 dB, A-MPR=0 dB, P-MPR=0 dB. ☐$T_C$=0 dB. MPR, A-MPR, P-MPR and ☐$T_C$ are defined in [8-1, TS 38.101-1], [8-2, TS38.101-2] and [8-3, TS 38.101-3]. The remaining parameters are defined in Clause 7.1.1 where $P_{O\_PUSCH,b,f,c}$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-PathlossReferenceRS-Id=0, and l=0.

10 UE Procedure for Receiving Control Information

10.1 UE Procedure for Determining Physical Downlink Control Channel Assignment A set of PDCCH candidates for a UE to monitor is defined in terms of PDCCH search space sets.

A search space set can be a CSS set or a USS set. A UE monitors PDCCH candidates in one or more of the following search spaces sets

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSysteminformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell
- a Type2-PDCCH CSS set configured by paging-SearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI and
- a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

Table 10.1-1 of 3GPP TS 38.213 V16.2.0, Entitled "CCE Aggregation Levels and Maximum Number of PDCCH Candidates Per CCE Aggregation Level for CSS Sets Configured by SearchSpaceSIB1", is Reproduced as FIG. 6

For each DL BWP configured to a UE in a serving cell, UE can be provided by higher layer signalling with
- P≤3 CORESETs if CORESETPoolIndex is not provided, or if a value of CORESETPoolIndex is same for all CORESETs if CORESETPoolIndex is provided
- P≤5 CORESETs if CORESETPoolIndex is not provided for a first CORESET, or is provided and has a value 0 for a first CORESET, and is provided and has a value 1 for a second CORESET For each CORESET, the UE is provided the following by ControlResourceSet:
- a CORESET index p, by controlResourceSetId, where 0<p<12 if CORESETPoolIndex is not provided, or if a value of CORESETPoolIndex is same for all CORESETs if CORESETPoolIndex is provided;
- 0<p<16 if CORESETPoolIndex is not provided for a first CORESET, or is provided and has a value 0 for a first CORESET, and is provided and has a value 1 for a second CORESET;
- a number of consecutive symbols provided by duration;
- a set of resource blocks provided by frequencyDomainResources;
- an antenna port quasi co-location, from a set of antenna port quasi co-locations provided by TCI-State, indicating quasi co-location information of the DM-RS antenna port for PDCCH reception in a respective CORESET;
- an indication for a presence or absence of a transmission configuration indication (TCI) field for a DCI format, other than DCI format 1_0, that schedules PDSCH receptions or indicates SPS PDSCH release and is transmitted by a PDCCH in CORESET p, by tci-PresentInDCI or tci-PresentInDCI-ForDCIFormat1_2-r16.

For each DL BWP configured to a UE in a serving cell, the UE is provided by higher layers with S≤10 search space sets where, for each search space set from the S search space sets, the UE is provided the following by SearchSpace:
- a search space set index s, 0≤s<40, by searchSpaceId
- an association between the search space set s and a CORESET p by controlResourceSetId
- a PDCCH monitoring periodicity of $k_s$ slots and a PDCCH monitoring offset of $o_s$ slots, by monitoringSlotPeriodicityAndOffset
- a PDCCH monitoring pattern within a slot, indicating first symbol(s) of the CORESET within a slot for PDCCH monitoring, by monitoringSymbolsWithinSlot
- a duration of $T_s<k_s$ slots indicating a number of slots that the search space set s exists by duration
- a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively
- an indication that search space set s is either a CSS set or a USS set by searchSpaceType
- if search space set s is a CSS set
  - an indication by dci-Format0-0-AndFormat1-0 to monitor PDCCH candidates for DCI format 0_0 and DCI format 1_0
  - an indication by dci-Format2-0 to monitor one or two PDCCH candidates, or to monitor one PDCCH candidate per RB set if the UE is providedfreqMonitorLocations-r16 for the search space set, for DCI format 2_0 and a corresponding CCE aggregation level
  - an indication by dci-Format2-4 to monitor PDCCH candidates for DCI format 2_4
- if search space set s is a USS set, an indication by dci-Formats to monitor PDCCH candidates either for DCI format 0_0 and DCI format 1_0, or for DCI format 0_1 and DCI format 1_1, or an indication by dci-Formats-Rel16 to monitor PDCCH candidates for DCI format 0_0 and DCI format 1_0, or for DCI format 0_1 and DCI format 1_1, or for DCI format 0_2 and DCI format 1_2, or, if a UE indicates a corresponding capability, for DCI format 0_1, DCI format 1_1, DCI format 0_2, and DCI format 1_2, or for DCI format 3_0, or for DCI format 3_1, or for DCI format 3_0 and DCI format 3_1

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^\mu$ [4, TS 38.211] in a frame with number $n_f$ if $(n_f \cdot N_{slot}^{frame,\mu} + n_{s,f}^\mu - o_s) \mod k_s = 0$. The UE monitors PDCCH candidates for search space set s for $T_s$ consecutive slots, starting from slot $n_{s,f}^\mu$, and does not monitor PDCCH candidates for search space set s for the next $k_s - T_s$ consecutive slots.

A USS at CCE aggregation level $L \in \{1, 2, 4, 8, 16\}$ is defined by a set of PDCCH candidates for CCE aggregation level L.

For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are given by $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

where for any CSS, $Y_{p,n_{s,f}}^\mu = 0$;

for a USS, $Y_{p,n_{s,f}}^\mu = (A_p \cdot Y_{p,n_{s,f}}^\mu - 1) \mod D$, $Y_{p,-1} = n_{RNTI} \neq 0$, $A_p = 39827$ for pmod3=0, $A_p = 39829$ for pmod3=1, $A_p = 39839$ for pmod3=2, and D=65537; i=0, . . . , L−1;

$N_{CCE,p}$ is the number of CCEs, numbered from 0 to $N_{CCE,p} - 1$, in CORESET p and, if any, per RB set;

$n_{CI}$ is the carrier indicator field value if the UE is configured with a carrier indicator field by CrossCarrierSchedulingConfig for the serving cell on which PDCCH is monitored; otherwise, including for any CSS, $n_{CI} = 0$;

$m_{s,n_{CI}} = 0, \ldots, M_{s,n_{CI}}^{(L)} - 1$, where $M_{s,n_{CI}}^{(L)}$ is the number of PDCCH candidates the UE is configured to monitor for aggregation level L of a search space set s for a serving cell corresponding to $n_{CI}$;

for any CSS, $M_{s,max}^{(L)} = M_{s,0}^{(L)}$;

for a USS, $M_{s,max}^{(L)}$ is the maximum of $M_{s,n_{CI}}^{(L)}$ over all configured $n_{CI}$ values for a CCE aggregation level L of search space set s;

the RNTI value used for $n_{RNTI}$ is the C-RNTI.

11.2A Cancellation Indication

If a UE is provided UplinkCancellation, the UE is provided, in one or more serving cells, a search space set for monitoring the first PDCCH candidate with a CCE aggregation level of $L_{CI}$ CCEs of the search space set for detection of a DCI format 2_4 [5, TS 38.212] with a CI-RNTI provided by ci-RNTI as described in Clause 10.1. Uplink-Cancellation additionally provides to the UE a set of serving cells, by ci-ConfigurationPerServingCell, that includes a set of serving cell indexes and a corresponding set of locations for fields in DCI format 2_4 by positionInDCI a number of fields in DCI format 2_4, by positionInDCI-forSUL, for each serving cell for a SUL carrier, if the serving cell is configured with a SUL carrier an information payload size for DCI format 2_4 by dci-PayloadSize-forCI an indication for time-frequency resources by timeFrequencyRegion For a serving cell having an associated field in a DCI format 2_4, for the field denote by $N_{CI}$ a number of bits provided by CI-PayloadSize $B_{CI}$ a number of PRBs provided by frequencyRegion-forCI in timeFrequencyRegion $T_{CI}$ a number of symbols, excluding symbols for reception of SS/PBCH blocks and DL symbols indicated by tdd-UL-DL-ConfigurationCommon, from a number of symbols that is provided by timeDurationforCI in timeFrequencyRegion, if the PDCCH monitoring periodicity for the search space set with the DCI format 2_4 is one slot and there are more than one PDCCH monitoring occasions in a slot, or is equal to the PDCCH monitoring periodicity, otherwise.

$G_{CI}$ a number of partitions for the $T_{CI}$ symbols provided by timeGranularityforCI in timeFrequencyRegion $G_{CI}$ sets of bits from the MSB of the $N_{CI}$ bits have a one-to-one mapping with $G_{CI}$ groups of symbols where each of the first $G_{CI} - T_{CI} + \lfloor T_{CI}/G_{CI} \rfloor \cdot G_{CI}$ groups includes $\lfloor T_{CI}/G_{CI} \rfloor$ symbols and each of the remaining $T_{CI} - \lfloor T_{CI}/G_{CI} \rfloor \cdot G_{CI}$ groups includes $\lfloor T_{CI}/G_{CI} \rfloor$ symbols. A UE determines a symbol duration with respect to a SCS configuration of an active DL BWP where the UE monitors PDCCH for DCI format 2_4 detection.

For a group of symbols, $N_{BI} = N_{CI}/G_{CI}$ bits from MSB of each set of bits have a one-to-one mapping with $N_{BI}$ groups of PRBs where each of the first $N_{BI} - B_{CI} + \lfloor B_{CI}/N_{BI} \rfloor \cdot N_{BI}$ groups includes $\lfloor B_{CI}/N_{BI} \rfloor$ PRBs and each of the remaining $B_{CI} - \lfloor B_{CI}/N_{BI} \rfloor \cdot N_{BI}$ groups includes $\lfloor B_{CI}/N_{BI} \rfloor$ PRBs. A UE determines a first PRB index as $N_{RFR}^{start} = O_{carrier} + RB_{start}$ and a number of contiguous RBs as $B_{CI} = L_{RB}$ from frequencyRegionforCI that indicates an offset $RB_{start}$ and a length $L_{RB}$ as RIV according to [6, TS 38.214], and from offsetTocarrier in FrequencyInfoUL-SIB or FrequencyInfoUL that indicates $O_{carrier}$ for a SCS configuration of an active DL BWP where the UE monitors PDCCH for DCI format 2_4 detection.

An indication by a DCI format 2_4 for a serving cell is applicable to a PUSCH transmission or an SRS transmission on the serving cell. If the PUSCH transmission or the SRS transmission is scheduled by a DCI format, the indication by the DCI format 2_4 is applicable to the PUSCH transmission or SRS transmission only if the last symbol of the PDCCH reception providing the DCI format is earlier than the first symbol of the PDCCH reception providing the DCI format 2_4. For the serving cell, the UE determines the first symbol of the $T_{CI}$ symbols to be the first symbol that is after $T'_{proc,2}$ from the end of a PDCCH reception where the UE detects the DCI format 2_4, where $T'_{proc,2}$ is obtained from $T_{proc,2}$ for PUSCH processing capability 2 [6, TS 38.214] assuming $d_{2,1} = d_{offset} \cdot 2^{-\mu UL}/2^{-\mu}$ where $d_{offset}$ is provided by delta_offset, µ being the smallest SCS configuration between the SCS configuration of the PDCCH and the smallest SCS configuration $\mu_{UL}$ provided in scs-SpecificCarrierList of FrequencyInfoUL or FrequencyInfoUL-SIB. The UE does not expect to cancel the PUSCH transmission or the SRS transmission before a corresponding symbol that is $T_{proc,2}$ assuming that $d_{2,1}=0$ after a last symbol of a CORESET where the UE detects the DCI format 2_4.

A UE that detects a DCI format 2_4 for a serving cell cancels a PUSCH transmission or an actual repetition of a PUSCH transmission [6, TS 38.214] if the PUSCH transmission is with repetitions, as determined in Clauses 9 and 9.2.5 or in Clause 6.1 of [6, TS 38.214], or an SRS transmission on the serving cell if, respectively, the transmission is PUSCH with priority 0, if the UE is provided applicabilityforCI, a group of symbols, from the Ta symbols, has at least one bit value of '1' in the corresponding set of $N_{BI}$ bits in the DCI format 2_4 and includes a symbol of the (repetition of the) PUSCH transmission or of the SRS transmission, and a group of PRBs, from the $B_{CI}$ PRBs, has a corresponding bit value of '1' in the set of bits corresponding to the group of symbols in the DCI format 2_4 and includes a PRB of the (repetition of the) PUSCH transmission or of the SRS transmission, where the cancellation of the (repetition of the) PUSCH transmission includes all symbols from the earliest symbol of the (repetition of the) PUSCH transmission that is in a group of symbols having corresponding bit values of '1' in the DCI format 2_4;

the cancellation of the SRS transmission includes only symbols that are in one or more groups of symbols having corresponding bit values of '1' in the DCI format 2_4.

If, based on an indication by a DCI format 2_4, a UE cancels a PUSCH transmission or an SRS transmission, the UE does not expect to be scheduled by a second DCI format to transmit a PUSCH or an SRS over symbols that include symbols of the cancelled PUSCH transmission or SRS transmission, where the last symbol of the PDCCH reception providing the second DCI format is later than the first symbol of the PDCCH reception providing the DCI format 2_4.

3GPP TS 38.214 V16.4.0 specifies the UE procedure for receiving the physical downlink shared channel as follows:

5.1 UE Procedure for Receiving the Physical Downlink Shared Channel

The UE is not expected to decode a PDSCH in a serving cell scheduled by a PDCCH with C-RNTI, CS-RNTI or MCS-C-RNTI and one or multiple PDSCH(s) required to be received according to this Clause in the same serving cell without a corresponding PDCCH transmission if the PDSCHs partially or fully overlap in time except if the PDCCH scheduling the PDSCH ends at least 14 symbols before the earliest starting symbol of the PDSCH(s) without the corresponding PDCCH transmission, where the symbol duration is based on the smallest numerology between the scheduling PDCCH and the PDSCH, in which case the UE shall decode the PDSCH scheduled by the PDCCH.

If a UE is configured by higher layer parameter PDCCH-Config that contains two different values of coresetPoolIndex in ControlResourceSet, the UE may expect to receive multiple PDCCHs scheduling fully/partially/non-overlapped PDSCHs in time and frequency domain. The UE may expect the reception of full/partially-overlapped PDSCHs in time only when PDCCHs that schedule two PDSCHs are associated to different ControlResourceSets having different values of coresetPoolIndex. For a ControlResourceSet without coresetPoolIndex, the UE may assume that the ControlResourceSet is assigned with coresetPoolIndex as 0. When the UE is scheduled with full/partially/non-overlapped PDSCHs in time and frequency domain, the full scheduling information for receiving a PDSCH is indicated and carried only by the corresponding PDCCH, the UE is expected to be scheduled with the same active BWP and the same SCS. When the UE is scheduled with full/partially-overlapped PDSCHs in time and frequency domain, the UE can be scheduled with at most two codewords simultaneously.

If PDCCHs that schedule corresponding PDSCHs are associated to the same or different ControlResourceSets having the same value of coresetPoolIndex, the UE procedure for receiving the PDSCH upon detection of a PDCCH follows Clause 5.1.

The 3GPP TSG RAN WG1 Meeting #102-e (Aug. 17-28, 2020) RAN1 Chairman's Notes lists the following agreements relating to further enhancement on MIMO for NR:

Agreement

To enable a PDCCH transmission with two TCI states, study pros and cons of the following alternatives:

Alt 1: One CORESET with two active TCI states

Alt 2: One SS set associated with two different CORESETs

Alt 3: Two SS sets associated with corresponding CORESETs

At least the following aspects can be considered: multiplexing schemes (TDM/FDM/SFN/combined schemes), BD/CCE limits, overbooking, CCE-REG mapping, PDCCH candidate CCEs (i.e. hashing function), CORESET/SS set configurations, and other procedural impacts.

Agreement

For non-SFN based mTRP PDCCH reliability enhancements, study the following options:

Option 1 (no repetition): One encoding/rate matching for a PDCCH with two TCI states Option 2 (repetition): Encoding/rate matching is based on one repetition, and the same coded bits are repeated for the other repetition. Each repetition has the same number of CCEs and coded bits, and corresponds to the same DCI payload.

Study both intra-slot repetition and inter-slot repetition

Option 3 (multi-chance): Separate DCIs that schedule the same PDSCH/PUSCH/RS/TB/etc. or result in the same outcome.

Study both cases of DCIs in the same slot and DCIs in different slots

Agreement

For mTRP PDCCH reliability enhancements, study the following multiplexing schemes TDM: Two sets of symbols of the transmitted PDCCH/two non-overlapping (in time) transmitted PDCCH repetitions/non-overlapping (in time) multi-chance transmitted PDCCH are associated with different TCI states Aspects and specification impacts related to intra-slot vs inter-slot to be discussed FDM: Two sets of REG bundles/CCEs of the transmitted PDCCH/two non-overlapping (in frequency) transmitted PDCCH repetitions/non-overlapping (in frequency) multi-chance transmitted PDCCH are associated with different TCI states SFN: PDCCH DMRS is associated with two TCI states in all REGs/CCEs of the PDCCH
    Note: There is dependency between this scheme and AI 2d (HST-SFN)
Agreement
For Alt 1-2/1-3/2/3, study the following
Case 1: Two (or more) PDCCH candidates are explicitly linked together (UE knows the linking before decoding)
Case 2: Two (or more) PDCCH candidates are not explicitly linked together (UE does not know the linking before decoding)
Agreement
For PDCCH reliability enhancements with non-SFN schemes, support at least Option 2+Case 1.
Maximum number of linked PDCCH candidates is two
One or multiple of following terminologies may be used hereafter:
  B: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  Serving beam: Serving beam for a UE is a beam generated by a network node, e.g. TRP, which is configured to be used to communicate with the UE, e.g. for transmission and/or reception.
  Candidate beam: Candidate beam for a UE is a candidate of a serving beam. Serving beam may or may not be candidate beam.

In NR Rel-15, beamforming technology are adopted to conquer the high power penetration in high frequency band, e.g. above 6 GHz. Hence, gNB and UE may both use some transmission beams and/or receiving beams to make high throughput data in such high frequency band reliable. How to choose suitable transmission beam and/or receiving beam has played an important role in NR Rel-15. Beam indication for various channels and reference signals are also well discussed and captured in specification along with the development of NR.

Nonetheless, in NR Rel-15, beam indication for receiving downlink (DL) transmission only considers transmission from a single TRP and/or using panel within a time duration (e.g. one slot or mini-slot), at least from perspective of UE. In NR Rel-16, people and companies resume to consider DL transmission from multiple TRPs and/or panels. For transmission from multiple TRP and/or panel, it may imply that a single DL transmission may be performed by different beam from multiple TRP and/or panel. It may also mean that UE may receive multiple DL transmission from multiple TRP and/or panel within a time duration (e.g. one slot or mini-slot). In NR Rel-16, enhancement to Ultra-Reliable Low-Latency Communication (URLLC) with consideration of multiple TRP scenario has been also made. Hence, there are some Physical Downlink Shared Channel (PDSCH) repetition schemes to improve reliability of receiving PDSCH. Some examples could be Spatial Domain Multiplexing (SDM) repetition scheme, FMD repetition scheme, mini-slot based repetition scheme and slot based repetition scheme.

Regarding NR Rel-17, people start to consider reliability enhancement of other channels, for example, PDCCH, Physical Uplink Control Channel (PUCCH) and PUSCH. Since PDCCH control scheduling information of PDSCH and PUSCH, there is no doubt that the enhancement of PDCCH should be emphasized first. To achieve reliability of PDCCH, one or more PDCCH repetition (from different TRP) on time domain could be one approach. In this approach, once one linkage between TRP and UE is blockage and result in failed PDCCH reception, there are another PDCCH repetition from same or different TRP for successfully scheduling. The one or more PDCCH repetition may provide same scheduling result for PDSCH or PUSCH. A number of the one or more PDCCH repetition is two (considering two PDCCH repetition as one pair/association/linkage). In order to achieve beam diversity or soft-combining gain, UE needs to know linkage of the one or more PDCCH repetition before decoding.

Once one linkage between TRP and UE is blocked and failed to receive one PDCCH, there could be another PDCCH repetition from same or different TRP for possible reception. The one or more PDCCH repetition may provide same scheduling result/information for PDSCH or PUSCH. A number of the one or more PDCCH repetition could be two (considering two PDCCH repetitions as one pair/association/linkage). In order to achieve beam diversity or soft-combining gain, UE may need to know linkage of the one or more PDCCH repetition before decoding. UE could be provided or configured with association/linkage/pair of two PDCCH repetition by search space configuration. Network could provide configuration on linking two search spaces. Network could provide same number of PDCCH candidate for one or more aggregation level (AL), same periodicity, slot offset, same number of consecutive slot duration, and/or same number of monitoring occasion within a slot for the linking two search spaces. As for the linkage of two search spaces, PDCCH candidate with one AL with PDCCH candidate index (i in one search space) comprises same scheduling information as PDCCH candidate with the same one AL with same PDCCH candidate index (i in the other search space). In other words, the two PDCCH candidates could be one example for PDCCH repetition.

Figure 13:
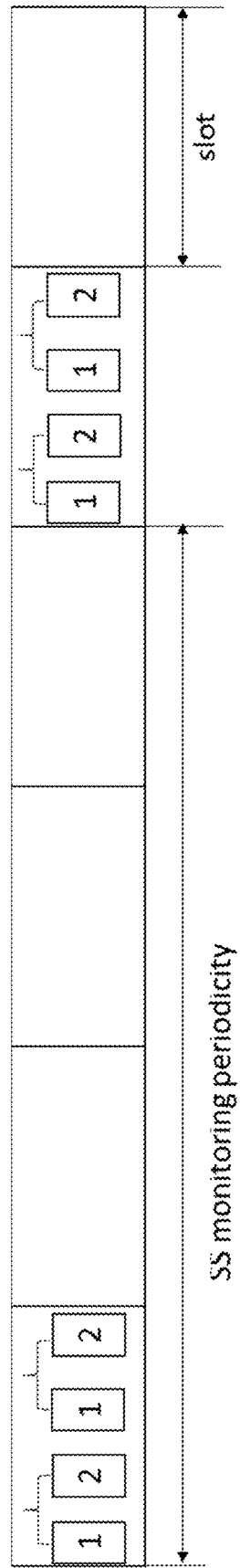
FIG. 13 is a diagram according to one exemplary embodiment.

As illustrated in the exemplary embodiment shown in FIG. 13, UE could be configured with linkage of search space 1 and search space 2, and configuration such that the number of PDCCH candidate for one or more aggregation level (AL), monitoring periodicity, slot offset, and number of PDCCH monitoring occasion in a slot could be the same. In one embodiment, PDCCH repetition could be intra-slot PDCCH repetition or inter-slot PDCCH repetition. For example, as shown in FIG. 13, as for intra-slot PDCCH repetition, PDCCH monitoring occasion associated to search space 1 and PDCCH monitoring occasion associated to search space 2 could be in the same slot. As another example, as for inter-slot PDCCH repetition, PDCCH monitoring occasion associated to search space 1 and PDCCH monitoring occasion associated to search space 2 could be in different slots.

3GPP TS 38.214 V16.3.0 specifies the UE procedure for receiving PDSCH considering at least two PDSCHs are partially or fully overlapped in time domain. One PDSCH of the at least two PDSCHs (e.g., first PDSCH) may be scheduled with C-RNTI or MCS-C-RNTI and/or associated to a PDCCH, and the other of the at least two PDSCHs (e.g., second PDSCH) may be without associated PDCCH (e.g., SPS PDSCH). Since UE may not have decoding capability for simultaneous receiving and/or decoding the two PDSCHs, current standard has a restriction in network side to satisfy UE's expectation.

In general, network shall avoid scheduling the first PDSCH overlapping with the second PDSCH. However, if there is time-sensitive downlink traffic (e.g., URLLC related traffic), the network may need to schedule the first PDSCH to override the second PDSCH. Consequently, overriding the second PDSCH may need some processing time for decoding in UE side for being aware network's update decision. The processing time may associate to PDCCH reception and/or monitoring and/or processing and/or decoding. The processing time may be 14 OFDM symbols preferably with SCS associated to be lower one between scheduling PDCCH and scheduled PDSCH. In other words, UE decodes the first PDSCH (and does not decode the second PDSCH) with condition of PDCCH scheduling the first PDSCH ends at least 14 symbols before the second PDSCH. From the base station (BS) perspective, BS may need to transmit PDCCH scheduling PDSCH with Cell Radio Network Temporary Identifier (C-RNTI) earlier when UE has configured PDSCH without any corresponding PDCCH. A BS could be a NW or vice versa throughout the description.

With respect to the above behavior on enhanced PDCCH reliability with repetition in time domain, there may appear several issues between BS and UE. Since it is beneficial for PDCCH with repetition or two linked PDCCH providing same scheduling result, no matter which one or two linked PDCCH is decoded successfully, UE would perform same PDSCH reception behavior. Consequently, for Semi-Persistent Scheduling (SPS) PDSCH reception being overridden by scheduled PDSCH, one or two linked PDCCH in different time occasion or ending in different Orthogonal Frequency Division Multiplexing (OFDM) symbols may be ambiguous for UE to cancel SPS PDSCH reception, and/or may be ambiguous for UE to receive which PDSCH. In other words, due to different time intervals between ending OFDM symbol of PDCCH of two linked PDCCH and starting OFDM symbol of SPS PDSCH, UE may have different understanding based on the decoding result of the two linked PDCCH.

For example, if BS transmits two linked PDCCH candidates for repetition to schedule PDSCH with C-RNTI, UE may have ambiguity of determining PDSCH for decoding.

For another example, if BS transmits two linked PDCCH candidates for repetition to schedule PDSCH with C-RNTI, with one of linked PDCCH candidates ends 14 symbols before the start of a PDSCH without any corresponding PDCCH while another PDCCH candidates ends less than 14 symbols. When UE decodes PDCCH candidate which ending 14 symbols before start of a PDSCH without any corresponding PDCCH, UE may decode corresponding PDSCH with C-RNTI. However, when UE decode PDCCH which ending less than 14 symbols before PDSCH without any corresponding PDCCH, UE may not expect to decode either PDSCH with C-RNTI or PDSCH without any corresponding PDCCH, causing inefficient resource utilization.

Figure 7:
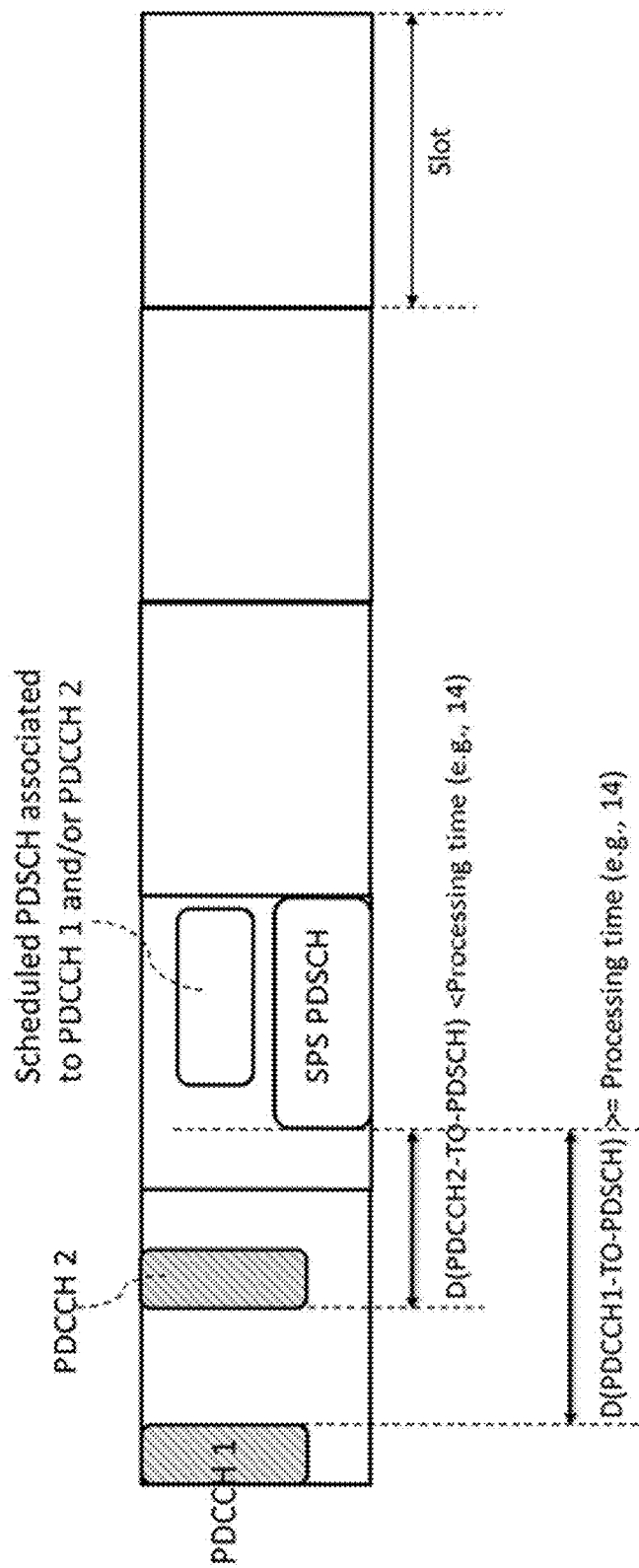
FIG. 7 is a diagram according to one exemplary embodiment.

For another example, as shown in FIG. 7, UE is configured to monitor PDCCH1 and PDCCH2, which are linked for repetition. In this case, since time interval/duration between starting OFDM symbol of a SPS PDSCH and PDCCH1 and PDCCH2 is different, once the scheduled PDSCH from PDCCH1 and/or PDCCH2 overlap with the SPS PDSCH. UE may force ambiguity whether to receive SPS PDSCH or based on dynamic scheduling. Based on different decoding result of PDCCH1 and PDCCH2, UE may have different understanding on whether to receive or cancel SPS PDSCH reception. Besides, network may know nothing about UE's decoding result of PDCCH1 and PDCCH2, and may cause misalignment between network and UE resulting unnecessary retransmission no matter with SPS PDSCH or scheduled PDSCH.

Therefore, in order to decode PDSCH with PDCCH repetition and/or receive or cancel SPS PDSCH in an efficient way, the following concepts and/or embodiments are provided. Which can be at least (but not limited to) used to determine association or linkage between linked PDCCH candidates and PDSCH without any corresponding PDCCH when considering improving the reliability of transmitting and/or receiving PDCCH and efficiency of resource utilization.

First Concept

The first concept of the invention is that, UE could decode PDSCH based on time domain association between first PDCCH candidate and/or second PDCCH candidate scheduling PDSCH with C-RNTI or MCS-C-RNTI and PDSCH without any corresponding PDCCH. PDSCH with C-RNTI or MCS-C-RNTI and PDSCH without any corresponding PDCCH may be partially or fully overlapping in time. First and second PDCCH candidates may be two linked PDCCH candidates. First and second PDCCH candidates could schedule PDSCH with C-RNTI or MCS-C-RNTI. First and second PDCCH candidates could be transmitted in time division multiplexing fashion. The first PDCCH candidate could be determined by PDCCH candidate which ends before in time among two linked PDCCH candidates. The second PDCCH candidate could be determined by the PDCCH candidate which ends later in time among two linked PDCCH candidates. UE could decode PDSCH with C-RNTI or MCS-C-RNTI if first PDCCH candidates end at least 14 symbols before start of a PDSCH without any corresponding PDCCH.

As an example of the first concept, UE could monitor first and second PDCCH candidates scheduling PDSCH with C-RNTI or MCS-C-RNTI. PDSCH with C-RNTI or MCS-C-RNTI and PDSCH without any corresponding PDCCH may be overlapping in time. UE could decode PDSCH with C-RNTI or MCS-C-RNTI if second PDCCH candidate ends at least 14 symbols before start of PDSCH without any corresponding PDCCH. The second PDCCH candidate could end later than first PDCCH candidate.

In one embodiment, UE could monitor a plurality of PDCCH candidate transmitted by BS. The plurality of PDCCH may comprise first PDCCH candidate and second PDCCH candidate. The first PDCCH candidate could be scrambled with C-RNTI or MCS-C-RNTI. The second PDCCH candidate could be scrambled with C-RNTI or MCS-C-RNTI. The first and second PDCCH candidates could be linked PDCCH candidates. The first and second PDCCH candidates could schedule the first PDSCH. The first PDCCH candidate could end before the second PDCCH candidate in time. The first PDSCH and second PDSCH could be partially or fully overlapping in time. The second PDSCH could be semi-persistent-scheduling PDSCH without any corresponding PDCCH.

In one embodiment, UE could decode the first PDSCH if the first condition is satisfied. UE may not decode the second PDSCH if the first condition is satisfied. The first condition could be a first PDCCH candidate that ends at least 14 symbols before start of a second PDSCH. Alternatively, the first condition could be the second PDCCH candidate that ends at least 14 symbols before start of the second PDSCH.

Text Proposals

The UE is not expected to decode a PDSCH scheduled in a serving cell with C-RNTI or MCS-C-RNTI and another PDSCH scheduled in the same serving cell with CS-RNTI if the PDSCHs partially or fully overlap in time except if the PDCCH or at least one of paired PDCCH scheduling the PDSCH with C-RNTI or MCS-C-RNTI ends at least 14 symbols before the start of the PDSCH with CS-RNTI without the corresponding DCI, in which case the UE shall decode the PDSCH scheduled with C-RNTI or MCS-C-RNTI.

The UE is not expected to decode a PDSCH scheduled in a serving cell with C-RNTI or MCS-C-RNTI and another PDSCH scheduled in the same serving cell with CS-RNTI if the PDSCHs partially or fully overlap in time except if the PDCCH or both PDCCH of a paired PDCCHs scheduling the PDSCH with C-RNTI or MCS-C-RNTI ends at least 14 symbols before the start of the PDSCH with CS-RNTI without any corresponding DCI, in which case the UE shall decode the PDSCH scheduled with C-RNTI or MCS-C-RNTI.

Second Concept

The second concept of the invention is that BS transmit first and second PDCCH candidate scheduling PDSCH with C-RNTI or MCS-RNTI both ending at least 14 symbols before start of PDSCH without any corresponding PDCCH. PDSCH with C-RNTI or MCS-C-RNTI and PDSCH without any corresponding PDCCH are overlapping in time. The first and second PDCCH candidates could be two linked PDCCH candidates. The first and second PDCCH candidates could schedule PDSCH with C-RNTI or MCS-C-RNTI. The first and second PDCCH candidates could be transmitted in time division multiplexing fashion. The first PDCCH candidate can be determined by PDCCH candidate which ends before in time among two linked PDCCH candidates. The second PDCCH candidate can be determined by the PDCCH candidate which ends later in time among two linked PDCCH candidates.

As an example of the second concept, BS could transmit the first and second PDCCH candidates scheduling PDSCH with C-RNTI or MCS-C-RNTI. PDSCH with C-RNTI or MCS-C-RNTI and PDSCH without any corresponding PDCCH are overlapping in time. The first PDCCH and second PDCCH could both end at least 14 symbols before start of PDSCH without any corresponding PDCCH. The second PDCCH candidate could end later than first PDCCH candidate.

In one embodiment, BS could transmit a plurality of PDCCH candidate to UE. The plurality of PDCCH may comprise a first PDCCH candidate and a second PDCCH candidate. The first PDCCH candidate could be scrambled with C-RNTI or MCS-C-RNTI. The second PDCCH candidate could be scrambled with C-RNTI or MCS-C-RNTI. The first and second PDCCH candidates could be linked PDCCH candidates. The first and second PDCCH candidates could schedule a first PDSCH. The first PDCCH candidate could end before the second PDCCH candidate in time. The first PDSCH and second PDSCH could be partially or fully overlapping in time. The second PDSCH could be a semi-persistent-scheduling PDSCH without any corresponding PDCCH. The first PDCCH candidate could end at least 14 symbols before the start of the second PDSCH. The second PDCCH candidate could end at least 14 symbols before start of the second PDSCH.

Third Concept

The third concept of the invention is that, BS could transmit only one of first and second PDCCH candidates scheduling PDSCH with C-RNTI or MCS-RNTI ending at least 14 symbols before start of PDSCH without corresponding PDCCH. PDSCH with C-RNTI or MCS-C-RNTI and PDSCH without any corresponding PDCCH could be overlapping in time. The first and second PDCCH candidates could be two linked PDCCH candidates. The first and second PDCCH candidates could schedule PDSCH with C-RNTI or MCS-C-RNTI. The first and second PDCCH candidates could be transmitted in time division multiplexing fashion. The first PDCCH candidate can be determined by PDCCH candidate which ends before in time among two linked PDCCH candidates. The second PDCCH candidate can be determined by the PDCCH candidate which ends later in time among two linked PDCCH candidates. The first PDCCH candidate could end at least 14 symbols before the start of PDSCH without any corresponding PDCCH. The second PDCCH candidate could end less than 14 symbols before the start of PDSCH without any corresponding PDCCH. The BS could transmit the first PDCCH candidate scheduling PDSCH with C-RNTI or MCS-RNTI ending at least 14 symbols before the start of PDSCH without any corresponding PDCCH.

As an example of the third concept, BS could transmit the first PDCCH candidate scheduling PDSCH with C-RNTI or MCS-C-RNTI. PDSCH with C-RNTI or MCS-C-RNTI and PDSCH without any corresponding PDCCH could be overlapping in time. The first PDCCH could end at least 14 symbols before the start of PDSCH without any corresponding PDCCH. The second PDCCH candidate could end less than 14 symbols before the start of PDSCH without any corresponding PDCCH.

In one embodiment, BS could configure a plurality of PDCCH candidate to UE. The plurality of PDCCH may comprise a first PDCCH candidate and a second PDCCH candidate. The first PDCCH candidate could be scrambled with C-RNTI or MCS-C-RNTI. The second PDCCH candidate could be scrambled with C-RNTI or MCS-C-RNTI. The first and second PDCCH candidates could be linked PDCCH candidates. The first and second PDCCH candidates could schedule a first PDSCH. The first PDCCH candidate could end before the second PDCCH candidate in time. The first PDSCH and the second PDSCH could be partially or fully overlapping in time. The second PDSCH could be a semi-persistent-scheduling PDSCH without any corresponding PDCCH. The first PDCCH candidate could end at least 14 symbols before the start of the second PDSCH. The second PDCCH candidate could end less than 14 symbols before the start of the second PDSCH.

In one embodiment, BS could transmit first PDCCH candidate without transmitting second PDCCH candidate to UE.

Throughout the invention, the invention describes behavior or operation of a single serving cell unless otherwise noted. Furthermore, "UE is configured" can be replaced by "UE receives a signal for configuring" or "UE receives a configuration for". Also, "network configures" can be replaced by "network transmits a signal for configuring" or "network transmits a configuration for". In addition, "network" can be replaced by "gNB" or "eNB" or "BS (base station)".

Figure 8:
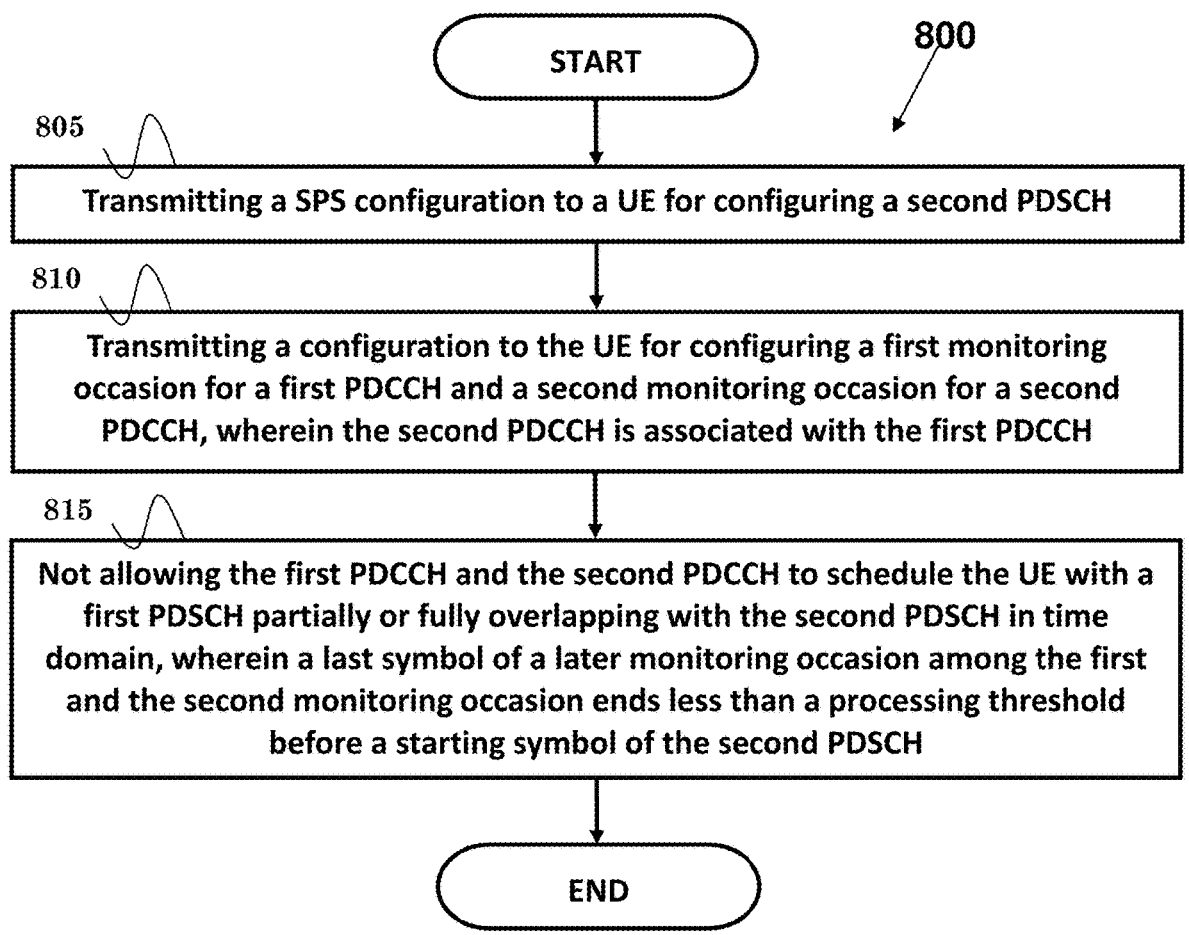
FIG. 8 is a flow chart according to one exemplary embodiment.

FIG. 8 is a flow chart 800 according to one exemplary embodiment from the perspective of a network. In step 805, the network transmits a SPS configuration to a UE for configuring a second PDSCH. In step 810, the network transmits a configuration to the UE for configuring a first monitoring occasion for a first PDCCH and a second monitoring occasion for a second PDCCH, wherein the second PDCCH is associated with the first PDCCH. In step 815, the network does not allow the first PDCCH and the second PDCCH to schedule the UE with a first PDSCH partially or fully overlapping with the second PDSCH in time domain, wherein a last symbol of a later monitoring occasion among the first and the second monitoring occasion ends less than a processing threshold before a starting symbol of the second PDSCH.

In one embodiment, the network may not transmit the second PDSCH when the last symbol of the later monitoring occasion among the first and the second monitoring occasion ends at least by the processing threshold before the starting symbol of the second PDSCH. The later monitoring occasion among the first and the second monitoring occasion may correspond to a monitoring occasion which ends later than another monitoring occasion among the first and the second monitoring occasion.

In one embodiment, the first monitoring occasion and the second monitoring occasion may be earlier than the second PDSCH. The processing threshold could be 14 Orthogonal Frequency Division Multiplexing (OFDM) symbols. Furthermore, the processing threshold could be associated with receiving and/or decoding PDCCH. In addition, the processing threshold could be fixed.

In one embodiment, the network could transmit the first PDCCH via a first beam or with a first Quasi-Colocation (QCL) assumption to a first Reference Signal (RS). The network could also transmit the second PDCCH via a second beam or with a second QCL assumption to a second RS. The first RS could be the same or different from the second RS.

In one embodiment, the first PDSCH could be scrambled or associated with C-RNTI, CS-RNTI, or MCS-C-RNTI. The first PDCCH could be scrambled or associated with C-RNTI or MCS-C-RNTI. The second PDCCH could be scrambled or associated with C-RNTI or MCS-C-RNTI. The first PDCCH could deliver or carry a Downlink Control Information (DCI) with same scheduling information as DCI delivered or carried by the second PDCCH.

In one embodiment, the second PDSCH may not be scheduled by a third PDCCH or there is no dynamic scheduling PDCCH for the second PDSCH. When only an earlier monitoring occasion among the first and the second PDCCH monitoring occasion ends at least by the processing threshold before a starting symbol of the second PDSCH, the network may not be allowed to transmit the first PDSCH partially or fully overlapping with the second PDSCH in time domain.

Referring back to FIGS. 3 and 4, in one exemplary embodiment of a network. The network 300 includes a program code 312 stored in the memory 310. The CPU 308 could execute program code 312 to enable the network (i) to transmit a SPS configuration to a UE for configuring a second PDSCH, (ii) to transmit a configuration to the UE for configuring a first monitoring occasion for a first PDCCH and a second monitoring occasion for a second PDCCH, wherein the second PDCCH is associated with the first PDCCH, and (iii) to not allow the first PDCCH and the second PDCCH to schedule the UE with a first PDSCH partially or fully overlapping with the second PDSCH in time domain, wherein a last symbol of a later monitoring occasion among the first and the second monitoring occasion ends less than a processing threshold before a starting symbol of the second PDSCH. Furthermore, the CPU 308 can execute the program code 312 to perform all of the above-described actions and steps or others described herein.

Figure 9:
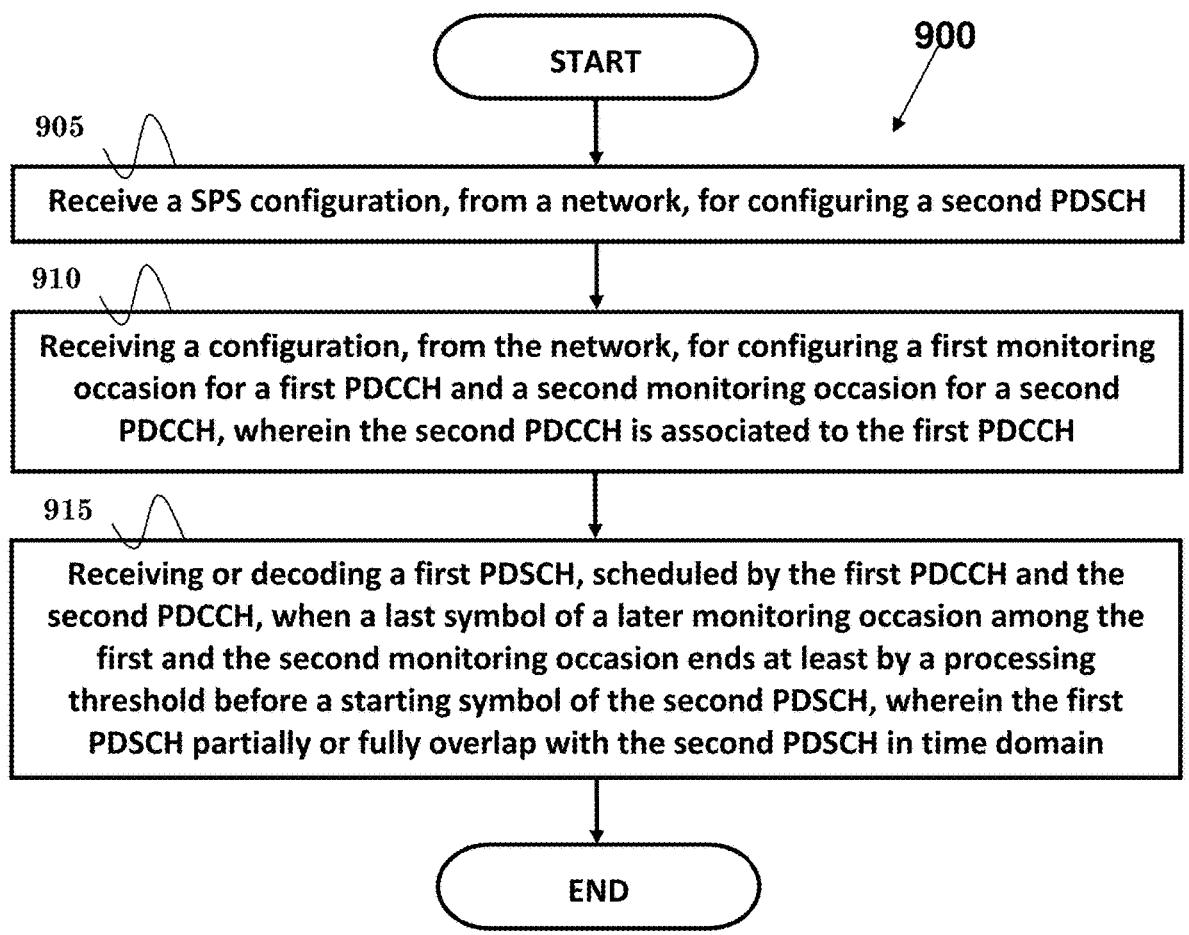
FIG. 9 is a flow chart according to one exemplary embodiment.

FIG. 9 is a flow chart 900 according to one exemplary embodiment from the perspective of a UE. In step 905, the UE receives a SPS configuration, from a network, for configuring a second PDSCH. In step 910, the UE receives a configuration, from the network, for configuring a first monitoring occasion for a first Physical Downlink Control Channel (PDCCH) and a second monitoring occasion for a second PDCCH, wherein the second PDCCH is associated to the first PDCCH. In step 915, the UE receives or decodes a first PDSCH, scheduled by the first PDCCH and the second PDCCH, when a last symbol of a later monitoring occasion among the first and the second monitoring occasion ends at least by a processing threshold before a starting symbol of the second PDSCH, wherein the first PDSCH partially or fully overlap with the second PDSCH in time domain.

In one embodiment, the UE may not receive or decode the second PDSCH when the last symbol of the later monitoring occasion among the first and the second monitoring occasion ends at least by the processing threshold before the starting symbol of the second PDSCH. Furthermore, the UE may not receive or decode the first PDSCH and/or receives or decodes the second PDSCH when the last symbol of the later monitoring occasion among the first and the second monitoring occasion does not end at least by the processing threshold before the starting symbol of the second PDSCH. In addition, the UE may not receive or decode the first PDSCH, and/or may not receive or decode the second PDSCH when only the first monitoring occasion ends at least by the processing threshold before the starting symbol of the second PDSCH.

In one embodiment, the first monitoring occasion and the second monitoring occasion may be earlier than the second PDSCH. The processing threshold could be 14 OFDM symbols. The processing threshold could be associated with PDCCH receiving and/or decoding. The processing threshold could be fixed.

In one embodiment, the later monitoring occasion among the first and the second monitoring occasion may correspond to a monitoring occasion which ends later than another monitoring occasion among the first and the second monitoring occasion.

In one embodiment, the UE could receive the first PDCCH via a first beam or with a first QCL to a first RS. The UE could receive the second PDCCH via a second beam or with a second QCL assumption to a second RS. The first RS could be the same or different from the second RS.

In one embodiment, the first PDSCH could be scrambled or associated with C-RNTI, CS-RNTI, or MCS-C-RNTI. The first PDCCH could be scrambled or associated with C-RNTI or MCS-C-RNTI. The second PDCCH could be scrambled or associated with C-RNTI or MCS-C-RNTI. The first PDCCH could deliver or carry a DCI with same scheduling information as DCI delivered or carried by the second PDCCH.

In one embodiment, the second PDSCH may not be scheduled by a third PDCCH. Furthermore, there may not be dynamic scheduling PDCCH for the second PDSCH.

Referring back to FIGS. 3 and 4, in one exemplary embodiment of a UE. The UE 300 includes a program code 312 stored in the memory 310. The CPU 308 could execute program code 312 to enable the UE (i) to receive a SPS configuration, from a network, for configuring a second PDSCH, (ii) to receive a configuration, from the network, for configuring a first monitoring occasion for a first PDCCH and a second monitoring occasion for a second PDCCH, wherein the second PDCCH is associated to the first PDCCH, and (iii) to receive or decode a first PDSCH, scheduled by the first PDCCH and the second PDCCH, when a last symbol of a later monitoring occasion among the first and the second monitoring occasion ends at least by a processing threshold before a starting symbol of the second PDSCH, wherein the first PDSCH partially or fully overlap with the second PDSCH in time domain. Furthermore, the CPU 308 can execute the program code 312 to perform all of the above-described actions and steps or others described herein.

Figure 10:
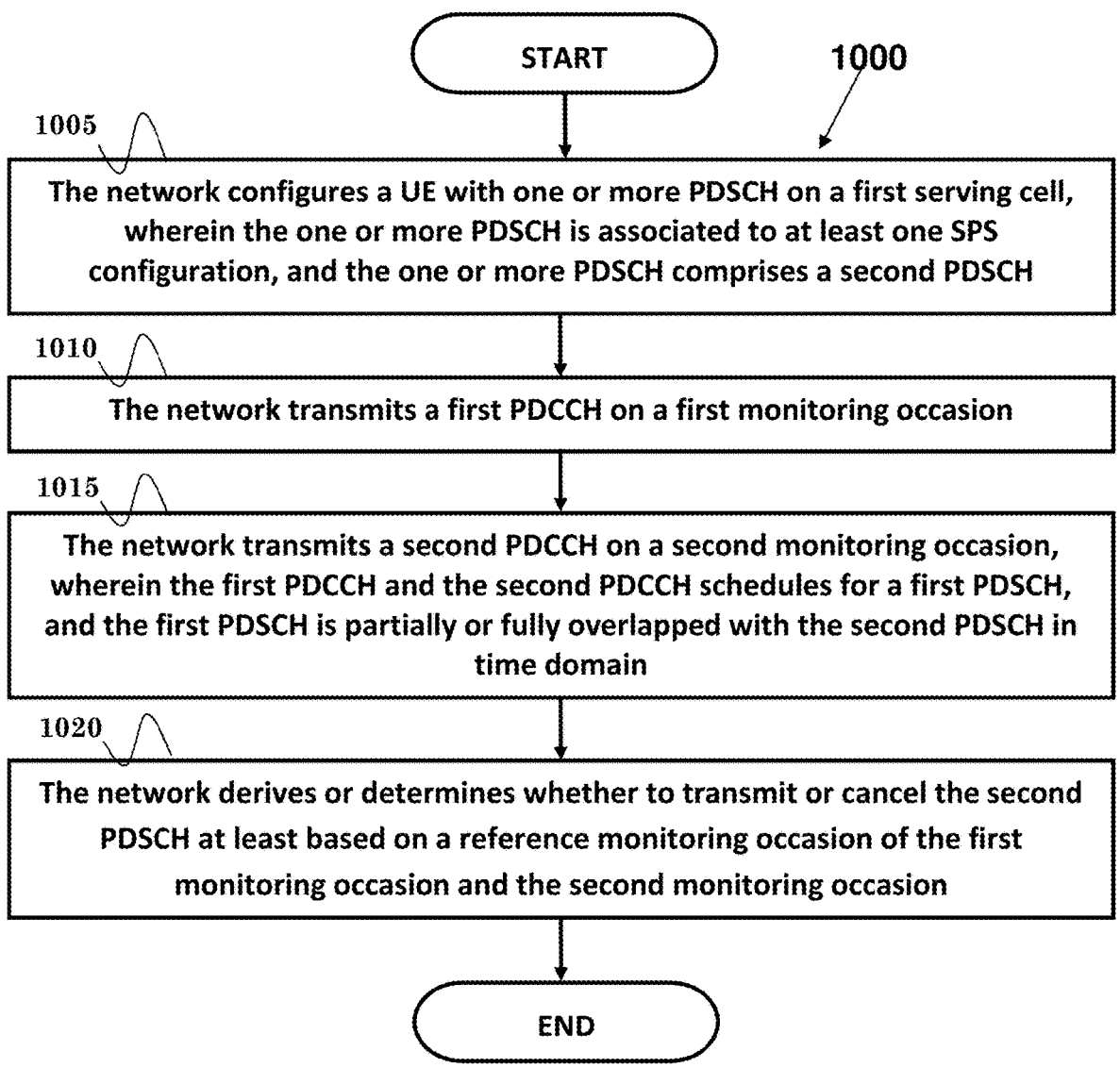
FIG. 10 is a flow chart according to one exemplary embodiment.

FIG. 10 is a flow chart 1000 according to one exemplary embodiment from the perspective of a network. In step 1005, the network configures a UE with one or more PDSCH on a first serving cell, wherein the one or more PDSCH is associated to at least one SPS configuration, and the one or more PDSCH comprises a second PDSCH. In step 1010, the network transmits a first PDCCH on a first monitoring occasion. In step 1015, the network transmits a second PDCCH on a second monitoring occasion, wherein the first PDCCH and the second PDCCH schedules for a first PDSCH, and the first PDSCH is partially or fully overlapped with the second PDSCH in time domain. In step 1020, the network derives or determines whether to transmit or cancel the second PDSCH at least based on a reference monitoring occasion of the first monitoring occasion and the second monitoring occasion.

In one embodiment, the reference monitoring occasion (of the first monitoring occasion and the second monitoring occasion) could be an earlier or latter monitoring occasion of the first monitoring occasion and the second monitoring occasion.

In one embodiment, the determination or derivation could be further based on the UE's processing time. The UE's processing time could be 14 OFDM symbol. The UE's processing time could be associated to PDCCH receiving and/or decoding. The determination or derivation could also be further based on a processing threshold. The processing threshold could be 14 OFDM symbol. The processing threshold could be associated to PDCCH receiving and/or decoding. In addition, the determination or derivation could be further based on time duration or time interval between an ending OFDM symbol of the reference monitoring occasion and a starting OFDM symbol of the second PDSCH.

In one embodiment, if the time duration or time interval is smaller than the UE's processing time or the processing threshold, the network could transmit the second PDSCH, and/or the network cancel or does not transmit the first PDSCH. If the time duration or time interval is equal to or larger than the UE's processing time or the processing threshold, the network could transmit the first PDSCH, and/or the network may cancel or may not transmit the second PDSCH. No matter or regardless of decoding result of the first PDCCH and/or the second PDCCH, the UE could determine whether to receive or cancel the second PDSCH (if/in response to an association of the first PDCCH and the second PDCCH).

In one embodiment, the first monitoring occasion and the second monitoring occasion could be non-overlapped in time domain or separated in time domain. The first PDSCH could be partially or fully overlapped or non-overlapped with the second PDSCH in frequency domain. The first PDSCH may comprise one or more PRB(s) with PRB index(s) which each PRB index is different from the second PDSCH, or at least partial PRB index is different from the second PDSCH.

In one embodiment, the network could transmit the first PDCCH via a first beam or with a first QCL assumption to a first RS. The network could transmit the second PDCCH via a second beam or with a second QCL assumption to a second RS. The first RS could be different from the second RS. The first PDCCH could be associated to a first search space. The second PDCCH could be associated to a second search space. The first search space could be associated with at least the first monitoring occasion. The second search space could be associated with at least the second monitoring occasion. The first search space and the second search space could be with different or same search space index. The first search space and the second search space could indicate a monitoring occasion in a DL Bandwidth Part (BWP) or in a DL BWP in the first (same) serving cell.

Referring back to FIGS. 3 and 4, in one exemplary embodiment of a network. The network 300 includes a program code 312 stored in the memory 310. The CPU 308 could execute program code 312 to enable the network (i) to configure a UE with one or more PDSCH on a first serving cell, wherein the one or more PDSCH is associated to at least one SPS configuration, and the one or more PDSCH comprises a second PDSCH, (ii) to transmit a first PDCCH on a first monitoring occasion, (iii) to transmit a second PDCCH on a second monitoring occasion, wherein the first PDCCH and the second PDCCH schedules for a first PDSCH, and the first PDSCH is partially or fully overlapped with the second PDSCH in time domain, and (iv) to derive or determine whether to transmit or cancel the second PDSCH at least based on a reference monitoring occasion of the first monitoring occasion and the second monitoring occasion. Furthermore, the CPU 308 can execute the program code 312 to perform all of the above-described actions and steps or others described herein.

Figure 11:
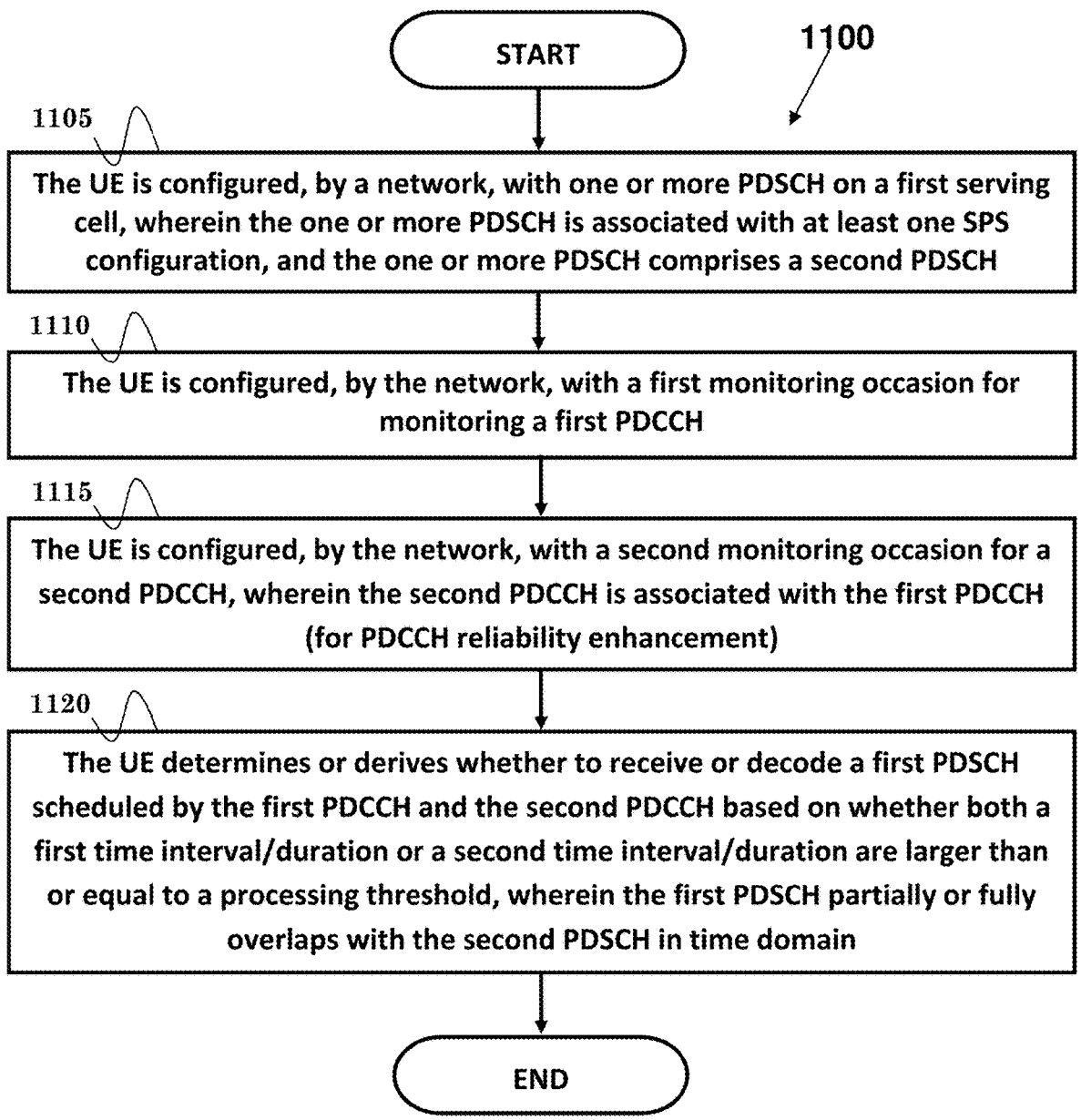
FIG. 11 is a flow chart according to one exemplary embodiment.

FIG. 11 is a flow chart 1100 according to one exemplary embodiment from the perspective of a UE. In step 1105, the UE is configured, by a network, with one or more PDSCH on a first serving cell, wherein the one or more PDSCH is associated with at least one SPS configuration, and the one or more PDSCH comprises a second PDSCH. In step 1110, the UE is configured, by the network, with a first monitoring occasion for monitoring a first PDCCH. In step 1115, the UE is configured, by the network, with a second monitoring occasion for a second PDCCH, wherein the second PDCCH is associated with the first PDCCH (for PDCCH reliability enhancement). In step 1120, the UE determines or derives whether to receive or decode a first PDSCH scheduled by the first PDCCH and the second PDCCH based on whether both a first time interval/duration or a second time interval/duration are larger than or equal to a processing threshold, wherein the first PDSCH partially or fully overlaps with the second PDSCH in time domain.

In one embodiment, the first time interval/duration could be between the first monitoring occasion and the second PDSCH, and/or the second time interval/duration could be between the second monitoring occasion and the second PDSCH. If both the first time interval/duration or the second time interval/duration are larger than or equal to the processing threshold, the UE could receive or decode the first PDSCH and/or the UE does not receive or decode the second PDSCH. If at least the first time interval/duration or the second time interval/duration is smaller than the processing threshold, the UE may not receive or decode the first PDSCH and/or receive or decode the second PDSCH. The first monitoring occasion and/or the second monitoring occasion could be earlier than the second PDSCH.

Referring back to FIGS. 3 and 4, in one exemplary embodiment of a UE. The UE 300 includes a program code 312 stored in the memory 310. The CPU 308 could execute program code 312 to enable the UE (i) to be configured, by a network, with one or more PDSCH on a first serving cell, wherein the one or more PDSCH is associated with at least one SPS configuration, and the one or more PDSCH comprises a second PDSCH, (ii) to be configured, by the network, with a first monitoring occasion for monitoring a first PDCCH, (iii) to be configured, by the network, with a second monitoring occasion for a second PDCCH, wherein the second PDCCH is associated with the first PDCCH (for PDCCH reliability enhancement), and (iv) to determine or derive whether to receive or decode a first PDSCH scheduled by the first PDCCH and the second PDCCH based on whether both a first time interval/duration or a second time interval/duration are larger than or equal to a processing threshold, wherein the first PDSCH partially or fully overlaps with the second PDSCH in time domain. Furthermore, the CPU 308 can execute the program code 312 to perform all of the above-described actions and steps or others described herein.

Figure 12:
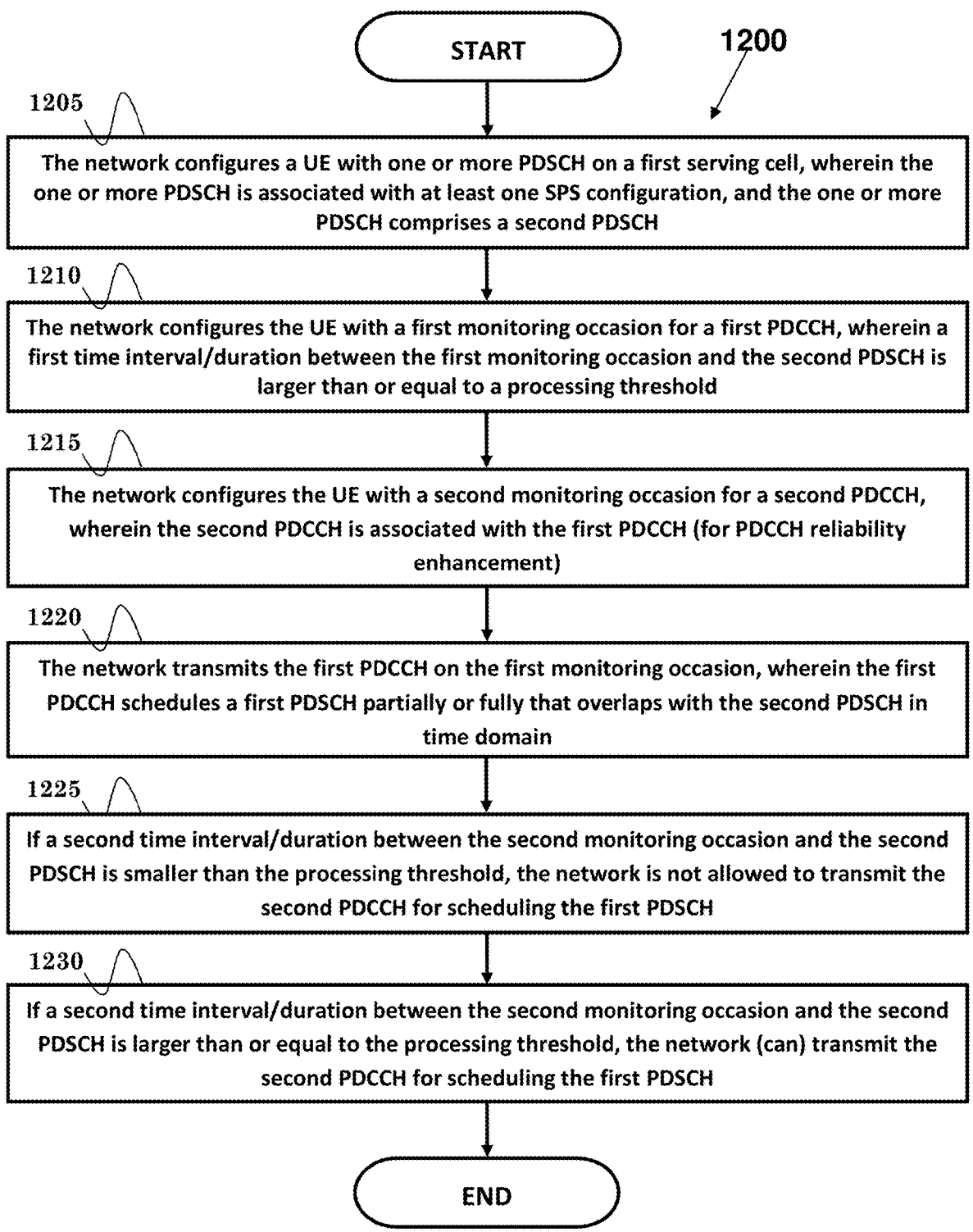
FIG. 12 is a flow chart according to one exemplary embodiment.

FIG. 12 is a flow chart 1200 according to one exemplary embodiment from the perspective of a network. In step 1205, the network configures a UE with one or more PDSCH on a first serving cell, wherein the one or more PDSCH is associated with at least one SPS configuration, and the one or more PDSCH comprises a second PDSCH. In step 1210, the network configures the UE with a first monitoring occasion for a first PDCCH, wherein a first time interval/duration between the first monitoring occasion and the second PDSCH is larger than or equal to a processing threshold. In step 1215, the network configures the UE with a second monitoring occasion for a second PDCCH, wherein the second PDCCH is associated with the first PDCCH (for PDCCH reliability enhancement). In step 1220, the network transmits the first PDCCH on the first monitoring occasion, wherein the first PDCCH schedules a first PDSCH partially or fully overlaps with the second PDSCH in time domain. In step 1225, if a second time interval/duration between the second monitoring occasion and the second PDSCH is smaller than the processing threshold, the network is not allowed to transmit the second PDCCH for scheduling the first PDSCH. In step 1230, if a second time interval/duration between the second monitoring occasion and the second PDSCH is larger than or equal to the processing threshold, the network (can) transmits the second PDCCH for scheduling the first PDSCH.

Referring back to FIGS. 3 and 4, in one exemplary embodiment of a network. The network 300 includes a program code 312 stored in the memory 310. The CPU 308 could execute program code 312 to enable the network (i) to configure a UE with one or more PDSCH on a first serving cell, wherein the one or more PDSCH is associated with at least one SPS configuration, and the one or more PDSCH comprises a second PDSCH, (ii) to configure the UE with a first monitoring occasion for a first PDCCH, wherein a first time interval/duration between the first monitoring occasion and the second PDSCH is larger than or equal to a processing threshold, (iii) to configure the UE with a second monitoring occasion for a second PDCCH, wherein the second PDCCH is associated with the first PDCCH (for PDCCH reliability enhancement), (iv) to transmit the first PDCCH on the first monitoring occasion, wherein the first PDCCH schedules a first PDSCH partially or fully that overlaps with the second PDSCH in time domain, (v) to not allowed to transmit the second PDCCH for scheduling the first PDSCH if a second time interval/duration between the second monitoring occasion and the second PDSCH is smaller than the processing threshold, and (vi) to transmit the second PDCCH for scheduling the first PDSCH if a second time interval/duration between the second monitoring occasion and the second PDSCH is larger than or equal to the processing threshold. Furthermore, the CPU 308 can execute the program code 312 to perform all of the above-described actions and steps or others described herein.

In the context of the embodiment illustrated in FIG. 12 and discussed above, no matter association of the first PDCCH and the second PDCCH (for PDCCH reliability), the UE could (consider to) receive (only) the first PDCCH and may not expect to receive the second PDCCH if the second time interval/duration is smaller than the processing threshold. The UE could be configured, by the network, with an association between the first PDCCH and the second PDCCH. If the UE does not decode the first PDCCH successfully, the UE could receive the second PDSCH, and/or may not receive the first PDSCH. If the UE decodes the first PDCCH successfully, the UE receives the first PDSCH and/or may not receive the second PDSCH regardless of whether the UE decodes the second PDCCH successfully.

In one embodiment, the processing threshold could be 14 OFDM symbol. The processing threshold could be associated with PDCCH receiving and/or decoding. The processing threshold could be fixed.

In one embodiment, the processing threshold for PDCCH reliability could be different or larger than the processing threshold for single PDCCH. The processing threshold for (soft) combining more than one PDCCH could be different or larger than the processing threshold for single PDCCH. The processing threshold for (soft combining) more than one PDCCH could be 14+delta OFDM symbols, and/or delta could be associated with UE capability or fixed in standard.

In one embodiment, the first monitoring occasion could be associated with or derived from a configuration of a first search space. The second monitoring occasion could be associated with or derived from a configuration of a second search space.

In one embodiment, the UE could be configured with link and/or association between the first search space and the second search space. The first search space may correspond to a first Control Resource Set (CORESET), and/or the second search space may correspond a second CORESET, and/or the first CORESET could be the same or different than the second CORESET. The first monitoring occasion and the second monitoring occasion could be on different serving cells (e.g., UE performs reception with TRPs in different cell). The first monitoring occasion and the second monitoring occasion could be on a second serving cell, and/or the second serving cell could be different or the same as the first serving cell. The first monitoring occasion and the second monitoring occasion could on/in a same slot or different slots.

In one embodiment, the configuration of the first search space could provide a bit map for indicating at least the first monitoring occasion, wherein the bit map can be "10000000000000", and the 1st "1" may correspond to the first OFDM symbol of the first monitoring occasion, which is the first OFDM symbol in a slot. The configuration of the second search space could provide a bit map for indicating at least the second monitoring occasion, wherein the bit map can be "00100000000000", and the 1st "1" may correspond to the first OFDM symbol of the first monitoring occasion which is the third OFDM symbol in a slot.

In one embodiment, the first PDCCH could deliver or carry a DCI with same scheduling information as DCI delivered or carried by the second PDCCH. (If the UE has reported capability related to soft-combining of PDCCH), the UE could perform soft-combining for the first PDCCH with the second PDCCH. The first PDCCH could be scrambled or associated with C-RNTI, CS-RNTI or MCS-C-RNTI. The second PDCCH could be scrambled or associated with C-RNTI, CS-RNTI or MCS-C-RNTI.

In one embodiment, the one or more PDSCH associated with at least one SPS PDSCH configuration is configured in a periodic manner. The first PDSCH could be scheduled on the first serving cell (which is the same serving cell as the second PDSCH). If the first PDSCH is scheduled on a second serving cell different than the first serving cell, the network could be allowed to transmit the second PDCCH on the second monitoring occasion. The first PDSCH could be scrambled or associated with C-RNTI, CS-RNTI or MCS-C-RNTI. The second PDSCH may not be associated to PDCCH, or there is no dynamic scheduling PDCCH for the second PDSCH.

In one embodiment, the first CORESET could be associated with a first antenna port quasi co-location (QCL), indicating quasi co-location information of the DM-RS antenna port for PDCCH reception in the first CORESET. The second CORESET could be associated to a second antenna port quasi co-location, indicating quasi co-location information of the DM-RS antenna port for PDCCH reception in the second CORESET. The first antenna port quasi co-location (/first beam/first QCLtype-D RS/first Transmission Configuration Indicator (TCI) state for the first CORESET) could be different from the second antenna port quasi co-location (/second beam/second QCLtype-D RS/second TCI state for the second CORESET).

In one embodiment, the first TCI state (for the first CORESET) could be active by a Medium Access Control Control Element (MAC CE). The second TCI state (for the second CORESET) could be active by a MAC CE. The first TCI state could be associated with the first serving cell or a DL/UL BWP in the first serving cell. The second TCI state could be associated with the first serving cell or a DL/UL BWP in the first serving cell. The second TCI state could be associated with the second serving cell or a DL/UL BWP in the second serving cell.

Fourth Concept

In NR Rel-15/16, power headroom report (PHR) could be transmitted by UE to inform network of remaining power headroom between current transmit power to UE's maximum transmit power. PHR report could be type-1 PHR report which is calculated based on PUSCH while type-3 PHR report is calculated based on SRS. PHR report could be calculated or derived based on actual transmission or based on reference format or parameter(s). One PHR (value) for a serving cell and/or carrier based on actual uplink transmission may refer a real PHR, while one PHR (value) for a serving cell and/or carrier based on reference format may refer a virtual PHR. PHR report will trigger according to 3GPP TS 38.321 V16.3.0 in UE side for (any) activated serving cell. One PHR (value) for a serving cell and/or carrier could be replaced by or equivalent to one power headroom (value) for a serving cell and/or carrier. UE will derive one or more PHR value for one or more activated serving cell. The one or more PHR value could be real or virtual. UE would generate one MAC CE indicating the one or more PHR value. UE would multiplex the one MAC CE on a MAC PDU. UE would transmit the MAC PDU based on an uplink grant scheduling a new/initial transmission.

Figure 14:
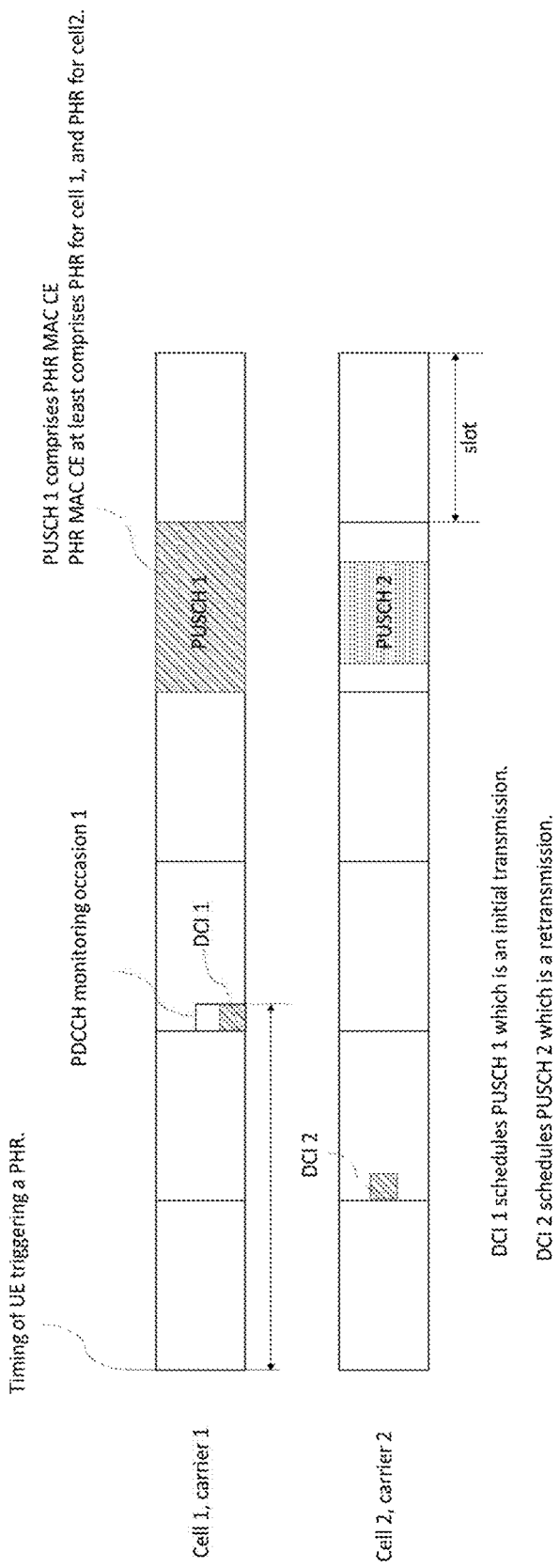
FIG. 14 is a diagram according to one exemplary embodiment.

For example, as shown in FIG. 14, UE has two activated serving cell (cell1, cell2). UE may trigger PHR due to pathloss change on at least cell 1 or cell 2. DCI 1 is the earliest DCI scheduling initial transmission (PUSCH 1) since/after the UE triggers PHR. In one embodiment, the intention for PDCCH monitoring occasion 1 for determining either real or virtual PHR could be to guarantee processing time for PHR value calculation and/or PUSCH generation. In this example, UE may receive DCI 2 before DCI 1, but DCI 2 schedules a retransmission (e.g., PUSCH 2). According to 3GPP TS 38.213 V16.4.0, an interval between (ending OFDM symbol of) PDCCH monitoring occasion 1 and timing of trigger PHR could be used for determining whether PHR value for one cell is real or virtual. In this example, considering PUSCH 1 comprises (PHR) MAC CE, and as DCI 2 scheduling PUSCH 2 is earlier than DCI 1, UE may calculate PHR value for cell 2 based on transmit power of PUSCH 2 which is a real PHR. In this example, PUSCH 1 and PUSCH 2 may be fully or partially overlapped in time domain.

In one embodiment, both PUSCH 1 and PUSCH 2 could be in a same slot but being non-overlapped in time domain. PUSCH 1 and PUSCH 2 could be in different slot. PUSCH 2 could be in a slot which is latter than another slot for PUSCH 1. PUSCH 2 could be in a slot which is earlier than another slot for PUSCH 1. PDCCH monitoring occasion 1 could be or span 1, 2, or 3 OFDM symbols.

Figure 15:
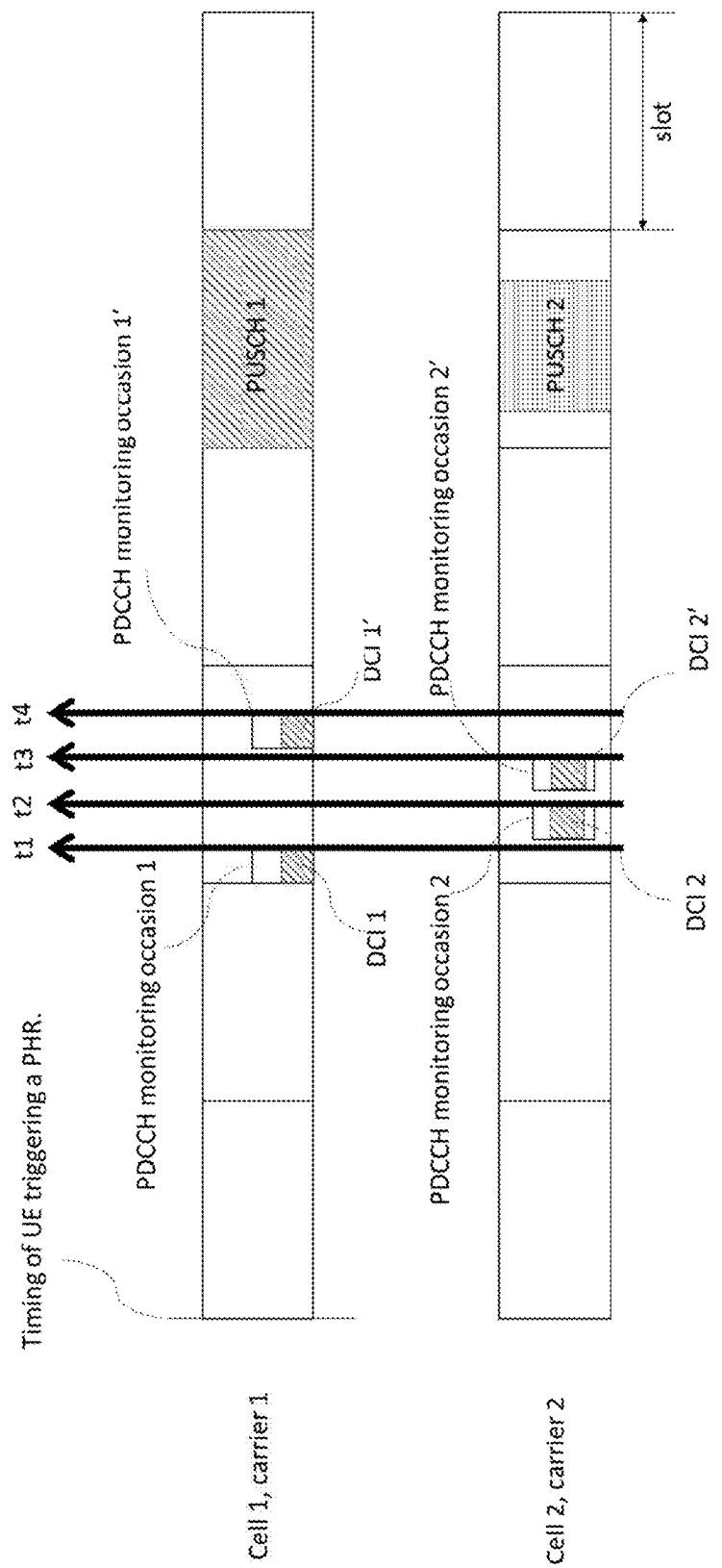
FIG. 15 is a diagram according to one exemplary embodiment.

However, as introduction of PDCCH repetition, there are one pair of PDCCHs in different PDCCH monitoring occasions scheduling a same PUSCH. It's not clear how to define the PDCCH monitoring occasion for comprising the earliest DCI since/after DCI triggers. For example, as shown in FIG. 15, UE could be configured with PDCCH repetition for cell 1 and for cell 2. In one embodiment, cell 1 and cell 2 could be self-scheduling (e.g., PDCCH/DCI and PDSCH/PUSCH are in same cell). According to linkage of two search spaces for cell 1 and linkage of two search spaces for cell 2, DCI 1 and DCI 1' could schedule the same PUSCH 1 while DCI 2 and DCI 2' could schedule the same PUSCH 2. Both PUSCH 1 and PUSCH 2 could be the initial transmission. In this example, with introduction of PDCCH repetition for one or more cells, possible PDCCH monitoring occasion and/or possible timing for determining whether a PHR value is real or virtual could be t1, t2, t3, or t4. In one embodiment, t1, t2, t3, t4 could be starting or ending OFDM symbol for each PDCCH monitoring occasion. How UE determines real or virtual PHR may need further design.

Figure 19:
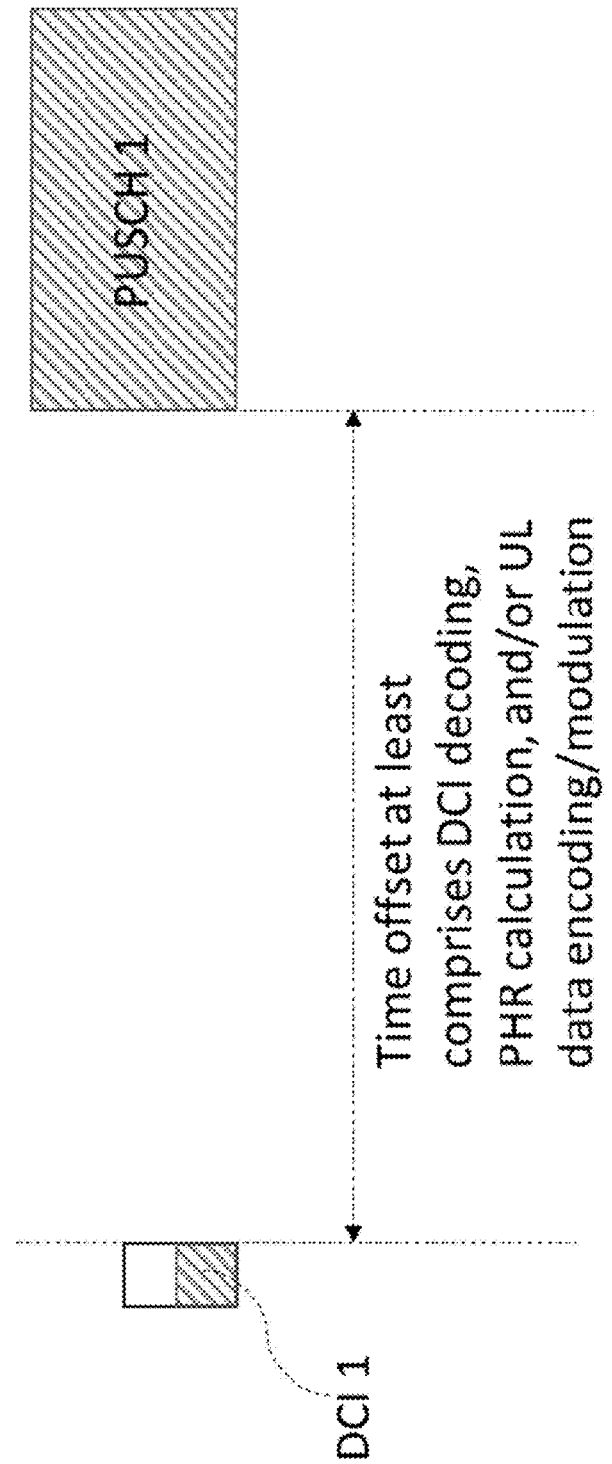
FIG. 19 is a diagram according to one exemplary embodiment.

In one embodiment as illustrated in FIG. 19, gNB would indicate an scheduling offset or timing offset between DCI 1 and PUSCH 1, wherein the scheduling offset shall guarantee for DCI decoding, PHR calculation, and/or UL data encoding/modulation.

In one embodiment, a scheduling cell could refer to a SCell, or a PCell. A scheduled cell could refer to a PCell, or a SCell. A Dynamic Spectrum Sharing (DSS) scenario for SCell scheduling PCell could be one addressed scenario.

In one embodiment, for a scheduled cell being cross-cell/carrier scheduled by a scheduling cell, the UE may not receive PDCCH on the scheduled cell. For determining earliest DCI since PHR is triggered scheduling initial PUSCH comprising PHR, the earliest DCI could be based on earliest one in time domain, and PDCCH monitoring occasion is the latter one comprises the earliest DCI.

This concept is to determine a specific DCI scheduling initial PUSCH (comprising or accommodating a Power Headroom Report (PHR)) based on the earliest received DCI since PHR is triggered. In one embodiment, the earliest received DCI could be associated to more than one PDCCH monitoring occasions. A specific monitoring occasion could be determined based on a latter PDCCH monitoring occasion comprising the specific DCI. UE would receive a plurality of DCIs since/after PHR is triggered. In one embodiment, one DCI of the plurality of DCIs may correspond to one or more PDCCH monitoring occasion. Each DCI of the plurality of DCIs could schedule initial transmission.

For PDCCH repetition or one DCI corresponding to more PDCCH monitoring occasions on a serving cell, UE could determine a reference PDCCH candidate (for a pair of PDCCH candidate) based on latter PDCCH candidate of the pair of PDCCH candidate.

For determining the specific DCI and/or the specific PDCCH monitoring occasion among a plurality of DCIs and the specific DCI associated to more than one PDCCH monitoring occasions, UE could determine the specific PDCCH monitoring occasion based on PDCCH monitoring occasion comprising the reference PDCCH candidate (e.g., the latter PDCCH monitoring occasion).

Figure 17:
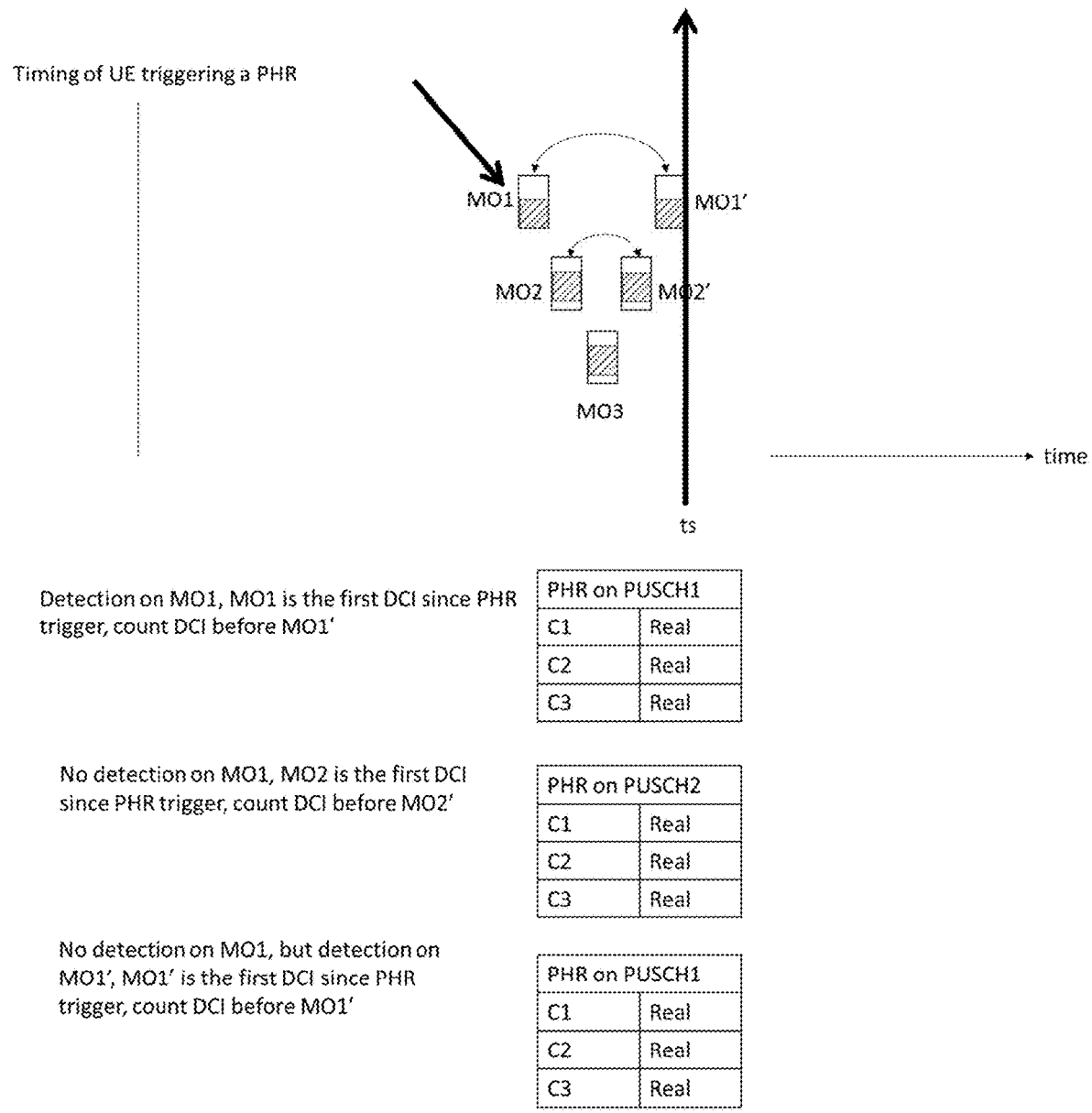
FIG. 17 is a diagram according to one exemplary embodiment.

For example, as shown in FIG. 17, cell 1 (C1) has MO1 associated to MO1', cell 2 (C2) has MP2 associated to MO2', and cell 3 (C3) has one MO3. In one embodiment, both PDCCH 1 in MO1 and PDCCH 1' in MO1' could schedule PUSCH 1 (which is an initial transmission). Both PDCCH 2 in MO2 and PDCCH 2' in MO2' could schedule PUSCH 2 (which is an initial transmission). PDCCH 3 in MO3 could schedule PUSCH 3 (which is an initial transmission).

In this example, if the UE detects one DCI in MO1, UE would transmit PUSCH 1 comprising PHR value for cell 1, cell 2, and/or cell 3. In one embodiment, (UE could determine that) the specific DCI is on MO1 (because MO1 is the being most earliest one comprising a received DCI since PHR is triggered). (UE could determine that) the specific PDCCH monitoring occasion is MO1' (which is the MO is the latter PDCCH monitoring occasion comprising the specific DCI since PHR is triggered). The reason of using MO1' as the specific PDCCH monitoring occasion may be when DCI one MO1 and MO1' are both detected, UE's processing timeline is based on MO1'. In other words, UE could still derive or calculate PHR for cell 2 based on DCI received in MO2 and/or MO2'. In this example, PHR for cell 1 may be real, PHR for cell 2 may be real, and PHR for cell 3 may be real.

In another example, if the UE does not detect one DCI in MO1 and detects one DCI in MO2, UE would transmit PUSCH 2 comprising PHR value for cell 1, cell 2, and/or cell 3. Preferably, (UE determines that) the specific DCI is on MO2 (because MO2 is the most earliest one comprising a received DCI since PHR is triggered). Preferably, (UE determines that) the specific PDCCH monitoring occasion is MO2' (which is the latter MO comprising the specific DCI since PHR is triggered). In this example, PHR for cell 1 is virtual, PHR for cell 2 is real, and PHR for cell 3 is real. Preferably, the UE does not derive or calculate PHR value for cell 1 based on PUSCH 1 (since PDCCH on MO1' for scheduling PUSCH 1 are latter than the specific monitoring occasion, and does not detect PDCCH on MO1).

In another example, if the UE does not detect one DCI in MO1' and detects one DCI in MO1', UE would transmit PUSCH 1 comprising PHR value for cell 1, cell 2, and/or cell 3. Preferably, (UE determines that) the specific DCI is on MO1'(because MO1 is the most PDCCH monitoring occasion being possibly received since PHR is triggered and UE receives the specific DCI on the associated PDCCH monitoring occasion, MO1'). Preferably, (UE determines that) the specific PDCCH monitoring occasion is MO1' (which is the latter MO comprising the specific DCI since PHR is triggered). In this example, PHR for cell 1 is real, PHR for cell 2 is real, and PHR for cell 3 is real.

Figure 18:
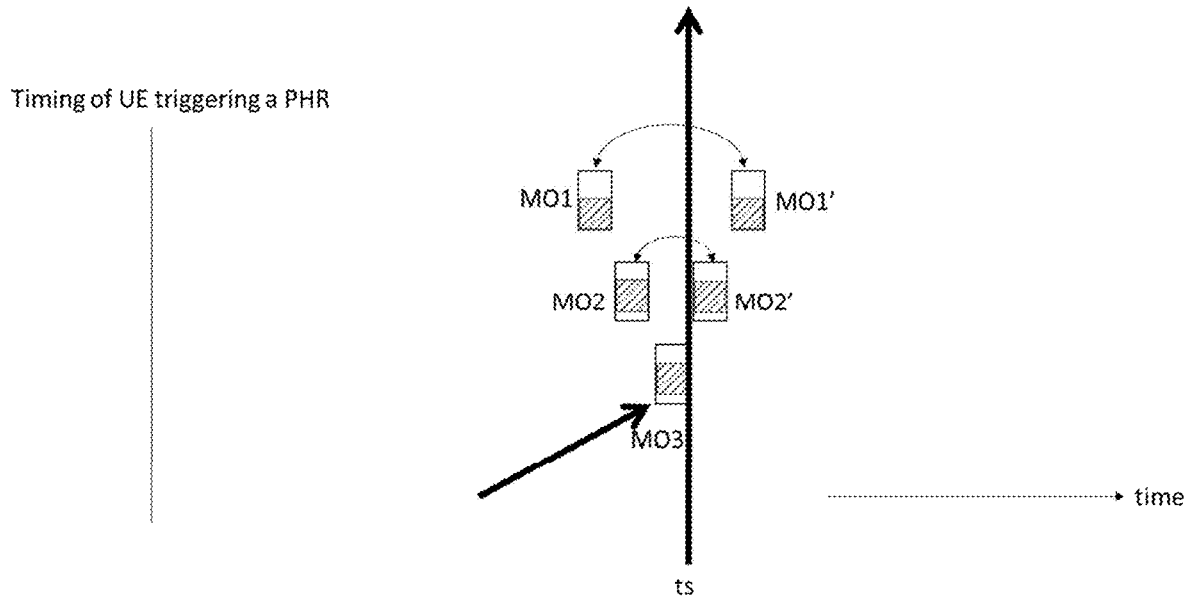
FIG. 18 is a diagram according to one exemplary embodiment.

For example, as shown in FIG. 18, cell 1 (C1) could have MO1 associated to MO1', cell 2 (C2) could have MP2 associated to MO2', and cell 3 (C3) could have one MO3. Both PDCCH 1 in MO1 and PDCCH 1' in MO1' could schedule PUSCH 1 (which is an initial transmission). Both PDCCH 2 in MO2 and PDCCH 2' in MO2' could schedule PUSCH 2 (which is an initial transmission). PDCCH 3 in MO3 could schedule PUSCH 3 (which is an initial transmission).

In this example, if the UE detects DCIs in MO1, MO2, MO1', MO2', and MO3, UE could determine the specific DCI based on MO3 (because MO3 is earliest than MO1', MO2'). (UE could determine that) the specific PDCCH monitoring occasion is based on MO3. MO1' could be the reference PDCCH monitoring occasion for determining timing for PDCCH repetition on MO1 and MO1'. MO2' could be the reference PDCCH monitoring occasion for determining timing for PDCCH repetition on MO2 and MO2'. The UE could transmit PUSCH 3 comprising PHR for cell1, PHR for cell2, and/or PHR for cell3.

In another example, if the UE detects DCIs in MO1, MO2, MO1', and MO2' and does not detect DCI on MO3, UE could determine the specific DCI based on MO3 (because MO2' is earlier than MO1'). (UE could determine that) the specific PDCCH monitoring occasion is based on MO2'. MO1' could be the reference PDCCH monitoring occasion for determining timing for PDCCH repetition on MO1 and MO1'. MO2' could be the reference PDCCH monitoring occasion for determining timing for PDCCH repetition on MO2 and MO2'. The UE could transmit PUSCH 2 comprising PHR for cell1, PHR for cell2, and/or PHR for cell3. In one embodiment, PHR for cell 1 may be virtual (if no detection DCI on MO1). PHR for cell 1 may be real. PHR for cell 2 may be real. PHR for cell 3 may be virtual (because no detection DCI on MO3).

In one embodiment, the UE may not detect DCI on a PDCCH monitoring occasion in this invention may mean or refer that the UE may not detect DCI or may not detect DCI for scheduling initial (uplink) transmission.

In one embodiment, UE could determine whether a PHR (for a serving cell) is real or virtual based on the specific PDCCH monitoring occasion (e.g., ending OFDM symbol of the specific PDCCH monitoring occasion is ts). The specific PDCCH monitoring occasion or ending OFDM symbol of the specific PDCCH monitoring occasion (e.g., ts) could be replaced by a specific timing associated to an (processing) interval before a configured grant PUSCH.

In one embodiment, MAC PDU comprising PHR MAC CE could be transmitted by configured grant PUSCH.

Figure 16:
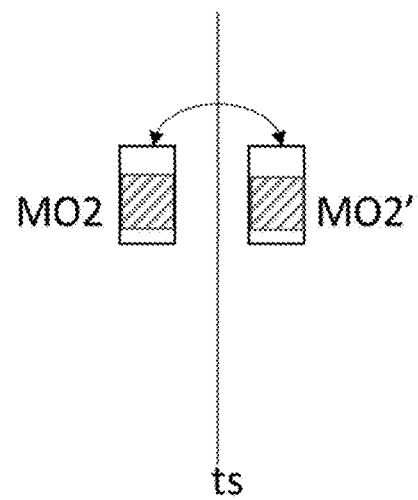
FIG. 16 is a diagram according to one exemplary embodiment.

For example, as shown in FIG. 16, a specific PDCCH monitoring occasion (e.g., ending in ts) comprising an earliest DCI scheduling initial PUSCH transmission since/after PHR is triggered. In this example, PDCCH monitoring occasions could be associated to two linked search spaces, and one PDCCH monitoring occasion (e.g., MO2) may be before (and/or including) ts and another PDCCH monitoring occasion (e.g., MO2') may be latter than ts. In one embodiment, DCI on MO2 and DCI on MO2' may have same scheduling information (and result). ts could be starting OFDM symbol or ending OFDM symbol of the specific PDCCH monitoring occasion. As for two linked PDCCHs/ search spaces/PDCCH monitoring occasion, there could be two criteria for determining whether it generates a real or virtual PHR value. The first criteria could be that real PHR value is determined based on at least one MO (being earlier than ts). The second criteria could be that real PHR value is determined based on at least both MO (being earlier than ts).

In one embodiment, UE may further determine based on whether UE receives DCI in (respective) MO or not. If UE receives DCI on both MO2 and MO2' (e.g., (MO2, MO2')=(Y, Y)), UE based on the first criteria could derive "real PHR", and/or UE based on the second criteria could derive s "virtual PHR". If UE receives DCI on MO2 and does not receive DCI on MO2' (e.g., (MO2, MO2')=(Y, N)), UE based on the first criteria could derive "real PHR", and/or UE based on the second criteria could derive "virtual PHR" (even the UE has received DCI on MO2). If UE does not receive DCI on MO2 and receives DCI on MO2' (e.g., (MO2, MO2')=(N, Y)), UE based on the first criteria could derive "virtual PHR", and/or UE based on the second criteria could derive "virtual PHR" (even the UE has received DCI on MO2').

Alternatively, if UE does not receive DCI on MO2 and receives DCI on MO2' (e.g., (MO2, MO2')=(N, Y)), UE based on the first criteria could derive "real PHR" (due to DCI reception on MO2'). If UE does not receive DCI on MO2 and does not receive DCI on MO2' (e.g., (MO2, MO2')=(N, N)), UE based on the first criteria could derive "virtual PHR" and/or UE based on the second criteria derives "virtual PHR". According to first criteria, a reference PDCCH candidate of two PDCCH candidates for determining whether a real or virtual PHR for a scheduled cell could be the first PDCCH (e.g., earlier one in time domain).

In one embodiment, for two search spaces of scheduling cell, one or two CORESETs could be associated to the two search spaces of scheduling cell, respectively. The one or two CORESETs could be associated to different TRP. The one or two CORESETs could be associated to different CORESETPoolIndex. The one or two CORESETs could be associated to different TCI state/beam/spatial relation/QCL type-D assumption/spatial filter.

In one embodiment, source RS of the different TCI state/beam/spatial relation/QCL type-D assumption/spatial filter may associate to different cell with different PCI.

In one embodiment, one scheduling cell may associate to one or more TCI states, wherein source RS of the one or more TCI states could be associated to one or more cells with different PCI.

In one embodiment, linking/link/linkage/association/pair of two search space (set) could refer or mean PDCCH repetition. UE could be configured with linking/link/linkage/association/pair of two search space (set) of a cell (e.g., SS1, SS2) by receiving a SS ID pointing or associating to another SS ID. In one embodiment, for a pair of PDCCH candidates comprising PDCCH1 and PDCCH2, PDCCH1 and PDCCH2 schedules a same PDSCH(s).

For example, as shown in FIGS. 13, 1 and 2 are linked search space, both PDCCH1 and PDCCH2 from the linked search space, respectively schedules the two PDSCHs. In one embodiment, linking/link/linkage/association/pair of two search space (set) may refer or mean that PDCCH1 from one of the two search space (set) could be linking/linked/associated/paired to PDCCH2 from the other of the two search space (set). PDCCH1 and PDCCH2 (which are linked/associated) may have same CCEs and/or same starting CCE. SS1 and SS2 (of a cell) being linked may refer or imply that PDCCH (candidate) with a PDCCH candidate ID from SS1 is linked to PDCCH (candidate) with the PDCCH candidate ID from SS2. PDCCH1 and PDCCH2 (which are linked/associated) could have same PDCCH candidate ID. PDCCH1 and PDCCH2 could be separated in time domain (TDM) or in frequency domain (FDM) or in spatial domain (SDM).

In one embodiment, CORESET for PDCCH1 could be separated from CORESET for PDCCH2 in time domain or in frequency domain or in spatial domain. CORESET for PDCCH1 may be partially overlapped with CORESET for PDCCH2 in time domain, frequency domain, and/or spatial domain.

In one embodiment, PDCCH monitoring occasion for PDCCH1 is separated from PDCCH monitoring occasion for PDCCH2 in time domain or in frequency domain or in spatial domain. In one embodiment, PDCCH monitoring occasion for PDCCH1 may be partially overlapped with PDCCH monitoring occasion for PDCCH2 in time domain, frequency domain, and/or spatial domain. In one embodiment, PDCCH1 and PDCCH2 could be a pair of PDCCH candidates. In one embodiment, PDCCH1 is associated to different TRP than PDCCH2. In one embodiment, PDCCH1 is associated to different CORESETPoolIndex than PDCCH2. In one embodiment, PDCCH1 is associated to different CORESET than PDCCH2. In one embodiment, PDCCH1 is associated to different TCI state/beam/spatial relation/QCL type-D assumption/spatial filter than PDCCH2.

In one embodiment, source RS of TCI state/beam/spatial relation/QCL type-D assumption/spatial filter associated to PDCCH1 is different than source RS of than TCI state/beam/spatial relation/QCL type-D assumption/spatial filter associated to PDCCH2.

In one embodiment, source RS of TCI state/beam/spatial relation/QCL type-D assumption/spatial filter associated to PDCCH1 may be associated to different PCI of cell than source RS of than TCI state/beam/spatial relation/QCL type-D assumption/spatial filter associated to PDCCH2.

In one embodiment, for a pair of PDCCH candidates, UE may assume X blind decode attempts or X BDs. In one embodiment, for non-pair of PDCCH candidates, UE may assume Y blind decode attempts or Y BDs. In one embodiment, X may be larger than or equal to Y. In one embodiment, UE may report value of X to a network. In one embodiment, Y is 2. In one embodiment, X is 2 or 3.

In one embodiment, for a pair of PDCCH candidates comprising PDCCH1 and PDCCH2, PDCCH1 and PDCCH2 schedules a same PUSCH(s). In one embodiment, for a pair of PDCCH candidates comprising PDCCH1 and PDCCH2, PDCCH1 and PDCCH2 indicates a same PUCCH(s). In one embodiment, for a pair of PDCCH candidates comprising PDCCH1 and PDCCH2, PDCCH1 and PDCCH2 indicates a same uplink scheduling and/or downlink assignment. In one embodiment, for a pair of PDCCH candidates comprising PDCCH1 and PDCCH2, one reference PDCCH may be determined from timing related aspect or may be determined by one reference PDCCH which is one of PDCCH1 and PDCCH2. In one embodiment, for a pair of PDCCH candidates comprising PDCCH1 and PDCCH2, the one reference PDCCH may be latter PDCCH in time domain (for determining timing related aspect). In one embodiment, for a pair of PDCCH candidates comprising PDCCH1 and PDCCH2, the one reference PDCCH may be earlier PDCCH in time domain (for determining counter DAI, or codebook determination). In one embodiment, for a pair of PDCCH candidates comprising PDCCH1 and PDCCH2, the one reference PDCCH may be PDCCH with lowest/highest CORESET ID or associated with lowest/highest SS ID (at least for determining beam or QCL relation for scheduled PDSCH). In one embodiment, for a pair of PDCCH candidates comprising PDCCH1 and PDCCH2, UE may perform soft-combining for the pair of PDCCH candidates. In one embodiment, for non-pair of PDCCH candidates, UE may not perform soft-combining for two PDCCH candidates.

In one embodiment, regardless of/no matter linkage or link is provided on two search spaces of scheduling cell or scheduled cell or both, UE expects limited/restricted configuration for two search space of scheduling cells. In one embodiment, regardless of/no matter linkage or link is provided on two search spaces of scheduling cell or scheduled cell or both, UE expects the second set of parameters and the third set of parameters is limited or restricted. In one embodiment, regardless of/no matter linkage or link is provided on two search spaces of scheduling cell or scheduled cell or both, UE expects the second set of parameters and the third set of parameters for two search spaces of scheduled cell is limited or restricted.

A cell could be associated with more than one PCI, e.g. including a first PCI and a second PCI. The first PCI could be indicated or derived from a (primary) synchronization signal and/or a (secondary) synchronization signal of the cell. The second PCI could be used for (inter-cell) mTRP operation. A first TRP and a second TRP are involved in the (inter-cell) mTRP operation. The (QCL source/parameters of signal/channel from) first TRP could be associated with the first PCI and the (QCL source/parameters of signal/channel from) second TRP could be associated with the second PCI.

In one embodiment, the UE may not expect could refer or mean or be equivalent to that a network's restriction or network is not allowed to or prohibited to. The UE may be configured and/or served in a serving cell by a network. The UE may be configured and/or indicated one or more BWP. The UE may be indicated and/or activated a (active) BWP. The UE may be indicated and/or activated an active DL BWP. The UE may be indicated and/or activated an active UL BWP. The UE may be configured and/or indicated an initial BWP.

In one embodiment, the first SS may be associated to a first TRP in a first serving cell. The second SS may be associated to a second TRP in a second serving cell. The first serving cell may be with serving cell index which could be the same or different than the serving cell index of the second serving cell.

In one embodiment, the UE may be in RRC_CONNECTED state. In one embodiment, the UE may be in RRC_INACTIVE state. The UE may be in RRC_IDLE state.

In one embodiment, the UE could be served by a first TRP. The UE could also be served by a second TRP. In one embodiment, the first TRP may belong to or be associated with the serving cell. The second TRP may belong to or be associated with the serving cell. The first TRP and the second TRP may belong to or may be associated with the same serving cell. Alternatively, the first TRP and the second TRP may belong to or may be associated with different serving cells.

In one embodiment, the first TRP may schedule or transmit a DL or UL transmission to the UE. The second TRP may schedule or transmit a DL or UL transmission to the UE. The first TRP may receive UL transmission from the UE. The second TRP may receive UL transmission from the UE.

In one embodiment, the two different CORESETs may belong to the first TRP and the second TRP (respectively). The one search space could be associated to one CORESET belonging to the first TRP and one CORESET belonging to the second TRP. The two different CORESETs may belong to same TRP either as the first TRP or the second TRP. In one embodiment, the two search spaces could be that one of the two search space could be associated to CORESET belonging to the first TRP, and the other one of the two search space could be associated to CORESET belonging to the second TRP.

Figure 20:
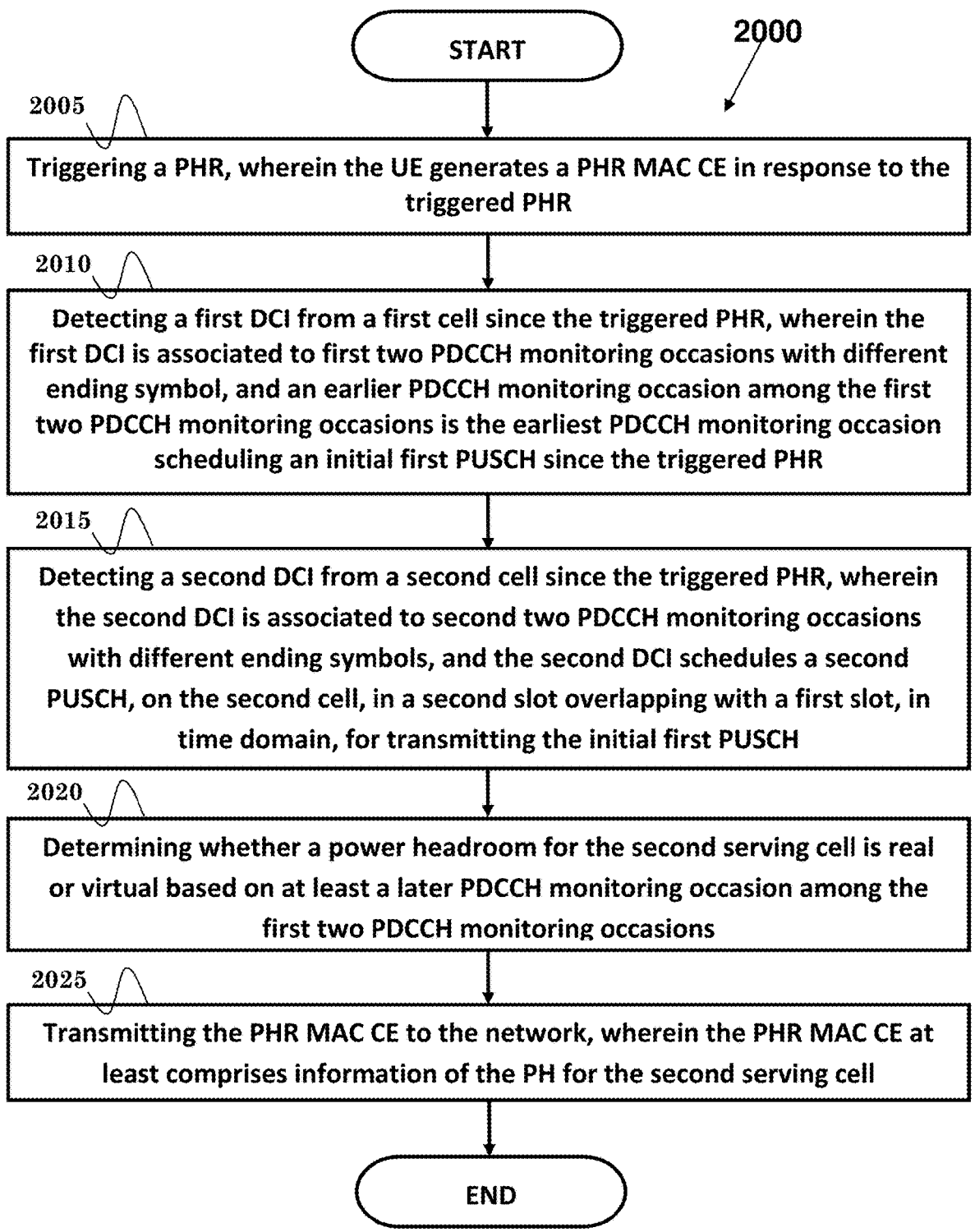
FIG. 20 is a flow chart according to one exemplary embodiment.

FIG. 20 is a flow chart 2000 according to one exemplary embodiment from the perspective of a UE. In step 2005, the UE triggers a PHR, wherein the UE generates a PHR MAC CE in response to the triggered PHR. In step 2010, the UE detects a first DCI from a first cell since the triggered PHR, wherein the first DCI is associated to first two PDCCH monitoring occasions with different ending symbol, and an earlier PDCCH monitoring occasion among the first two PDCCH monitoring occasions is the earliest PDCCH monitoring occasion scheduling an initial first PUSCH since the triggered PHR. In step 2015, the UE detects a second DCI from a second cell since the triggered PHR, wherein the second DCI is associated to second two PDCCH monitoring occasions with different ending symbols, and the second DCI schedules a second PUSCH, on the second cell, in a second slot overlapping with a first slot, in time domain, for transmitting the initial first PUSCH. In step 2020, the UE determines whether a power headroom for the second serving cell is real or virtual based on at least a later PDCCH monitoring occasion among the first two PDCCH monitoring occasions. In step 2025, the UE transmits the PHR MAC CE to the network, wherein the PHR MAC CE at least comprises information of the power headroom (PH) for the second serving cell.

In one embodiment, when ending symbol of the later PDCCH monitoring occasion among the second two PDCCH monitoring occasions is later than ending symbol of later PDCCH monitoring occasion among the first two PDCCH monitoring occasions, the power headroom for the second serving cell could be determined as virtual. Furthermore, the power headroom for the second serving cell could be determined not based on the second PUSCH. In addition, the power headroom for the second serving cell could be determined based on a reference format.

In one embodiment, when ending symbol of the later PDCCH monitoring occasion among the second two PDCCH monitoring occasions is earlier than or including ending symbol of later PDCCH monitoring occasion among the first two PDCCH monitoring occasions, the power headroom for the second serving cell could be determined as real. Furthermore, the power headroom for the second serving cell could be determined based on the second PUSCH. In addition, the power headroom for the second serving cell could be determined based on a difference between a UE maximum transmit power and an estimated power for the second PUSCH. In one embodiment, the format could be associated to a reference maximum transmit power, one or more default set of parameters for determining a reference transmit power, wherein based on the reference format, the power headroom for the second serving cell could be determined based on a difference between the reference maximum transmit power and the reference transmit power.

In one embodiment, the UE could transmit the PHR MAC CE to the network at least comprises the UE transmits the PHR MAC CE on the initial first PUSCH, wherein the initial first PUSCH could be transmitted on the first cell.

In one embodiment, the first two PDCCH monitoring occasions could be configured by configuring two linking search spaces on the first serving cell, and/or the second two PDCCH monitoring occasions could be configured by configuring two linking search spaces on the second serving cell.

Referring back to FIGS. 3 and 4, in one exemplary embodiment of a UE. The UE 300 includes a program code 312 stored in the memory 310. The CPU 308 could execute program code 312 to enable the UE (i) to trigger a PHR, wherein the UE generates a PHR MAC CE in response to the triggered PHR, (ii) to detect a first DCI from a first cell since the triggered PHR, wherein the first DCI is associated to first two PDCCH monitoring occasions with different ending symbol, and an earlier PDCCH monitoring occasion among the first two PDCCH monitoring occasions is the earliest PDCCH monitoring occasion scheduling an initial first PUSCH since the triggered PHR, (iii) to detect a second DCI from a second cell since the triggered PHR, wherein the second DCI is associated to second two PDCCH monitoring occasions with different ending symbols, and the second DCI schedules a second PUSCH, on the second cell, in a second slot overlapping with a first slot for transmitting the initial first PUSCH, (iv) to determine whether a power headroom for the second serving cell is real or virtual based on at least a later PDCCH monitoring occasion among the first two PDCCH monitoring occasions, and (v) to transmit the PHR MAC CE to the network, wherein the PHR MAC CE at least comprises information of the PH for the second serving cell. Furthermore, the CPU 308 can execute the program code 312 to perform all of the above-described actions and steps or others described herein.

Fifth Concept

In Rel-16, uplink cancellation indicator (ULCI) was introduced for purpose of better supporting inter-UE multiplexing and prioritization between UL transmissions. The ULCI may allow NW to cancel UL transmission with lower priority scheduled to group of UEs when there is necessary to schedule an UE with UL transmission of higher priority. Alternatively, the ULCI may allow NW to cancel UL transmission scheduled to group of UEs regardless of priority (e.g., indicated by priority index field in DCI) when there is necessary to schedule an UE with UL transmission. In one embodiment, higher priority index could be associated with higher priority. Priority index 1 would be with priority higher than priority index 0.

For example, the ULCI may cancel (eMBB) transmissions of first UE and second UE when the NW needs to schedule latency-critical URLLC traffic to third UE. The first and second UE may cancel corresponding UL transmission when the cancellation timeline is satisfied. The third UE may transmit UL with URLLC service which satisfies the latency requirement of the service.

For UE supporting and/or being configured with ULCI, the UE could monitor DCI format 2_4 scrambled with CI-RNTI in type3 PDCCH CSS. The UE may cancel corresponding PUSCH/SRS indicated by detected DCI 2_4 when cancellation timeline satisfied, e.g. UE cancel corresponding PUSCH/SRS after $T_{proc,2}$ and does not expect to cancel corresponding PUSCH/SRS within Tproc,2. In one embodiment, PUSCH/SRS could be scheduled by DCI (e.g., DCI format 0_0, 0_1, and/or 0_2) or configured by higher layer (e.g., CG type-1, type-2 PUSCH).

According to 3GPP TS 38.213 V16.4.0, an indication by a DCI format 2_4 for a serving cell is applicable to a PUSCH transmission or an SRS transmission on the serving cell. If the PUSCH transmission or the SRS transmission is scheduled by a DCI format, the indication by the DCI format 2_4 is applicable to the PUSCH transmission or SRS transmission (only) if the last symbol of the PDCCH reception providing the DCI format is earlier than the first symbol of the PDCCH reception providing the DCI format 2_4. Therefore, to cancel a UL transmission scheduled by DCI, the first symbol of PDCCH providing DCI format 2_4 should be later than the last symbol of DCI scheduling the UL transmission. If first symbol of PDCCH providing DCI format 2_4 is earlier than last symbol of DCI scheduling the UL transmission, the UL transmission may not be canceled based on indication of DCI format 2_4.

From the network perspective, network may fail to schedule another UL transmission with higher priority since un-canceling already scheduled UL transmission may cause interference on the scheduled another UL transmission. In one embodiment, UE could be configured with one or more position for one or more serving cells, respectively, wherein each position indicates starting position for ULCI for each corresponding serving cell.

It may be beneficial for PDCCH providing DCI format 2_4 transmitted with PDCCH repetition to better serve UE with critical service and multiplex UE with different service efficiently. For example, the first PDCCH candidate and the second PDCCH candidate providing DCI format 2_4 could be associated/linked with each other in PDCCH repetition in a slot/slots. With PDCCH repetition of PDCCH providing DCI format 2_4, UE may detect ULCI reliably and conform with latency requirement of critical UL transmission. One rationale for PDCCH repetition with different beam or spatial filter on DCI format 2_4 may be to improve reception reliability of DCI format 2_4.

In one embodiment, the PDCCH repetition on DCI format 24 may carry same DCI format content (e.g., same cancellation indication, same ULCI). In this sense, one or more UE may have secondary chance for receiving DCI format 2_4, and thus, even one beam/spatial filter or channel path is blocked by obstacle, the UE could receive DCI format 2_4 for grasping ULCI by another beam/spatial filter.

Figure 21:
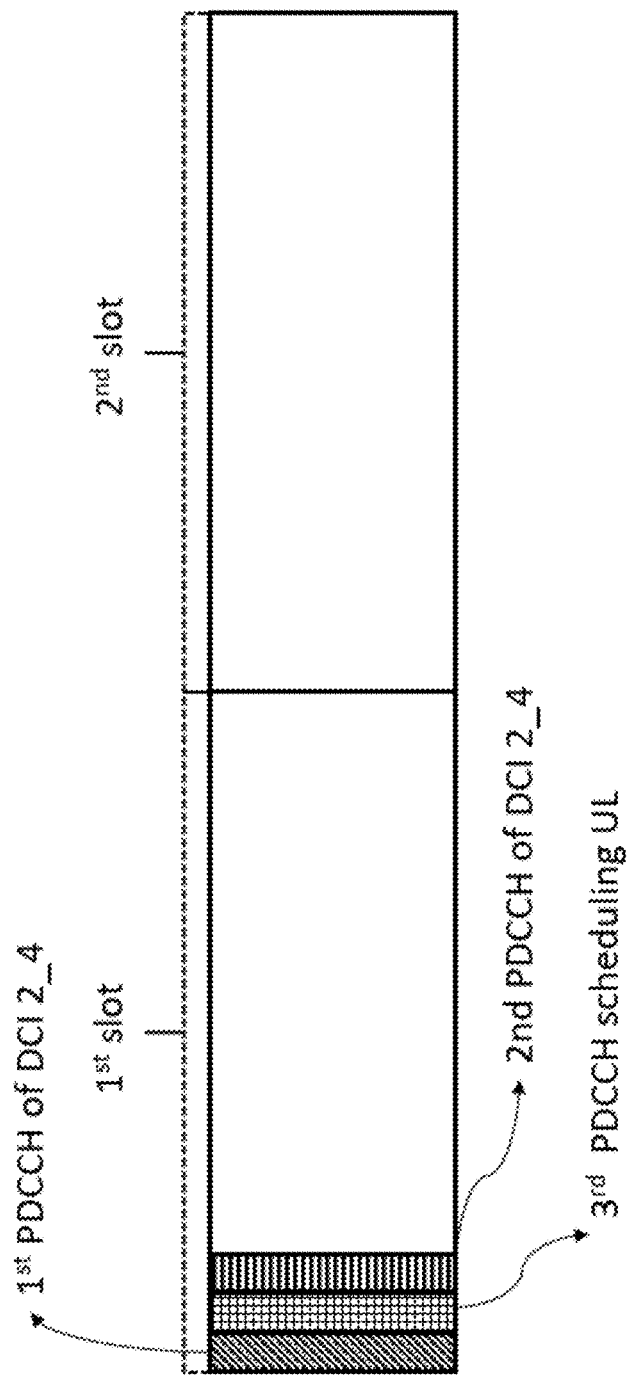
FIG. 21 is a diagram according to one exemplary embodiment.

For example, as shown in FIG. 21, the first PDCCH candidate and the second PDCCH candidate providing DCI format 2_4 could be transmitted in a slot with intra-slot PDCCH repetition. The third PDCCH candidate providing DCI scheduling a UL transmission could be transmitted in the slot. The first PDCCH candidate could be transmitted in the first symbol of the slot in CSS associated with CORESET with 1 symbol time duration. The second PDCCH candidate could transmitted in the third symbol of the slot in another CSS associated with CORESET with 1 symbol duration. The third PDCCH candidate could be transmitted in the second symbol of the slot in USS associated with CORESET with 1 symbol duration. As the last symbol of third PDCCH candidate is earlier than the first symbol of second PDCCH candidate and is later than first symbol of first PDCCH candidate in the slot, applicability of indication of DCI format 2_4 to UL transmission scheduled by third PDCCH candidate could be uncertain.

Figure 22:
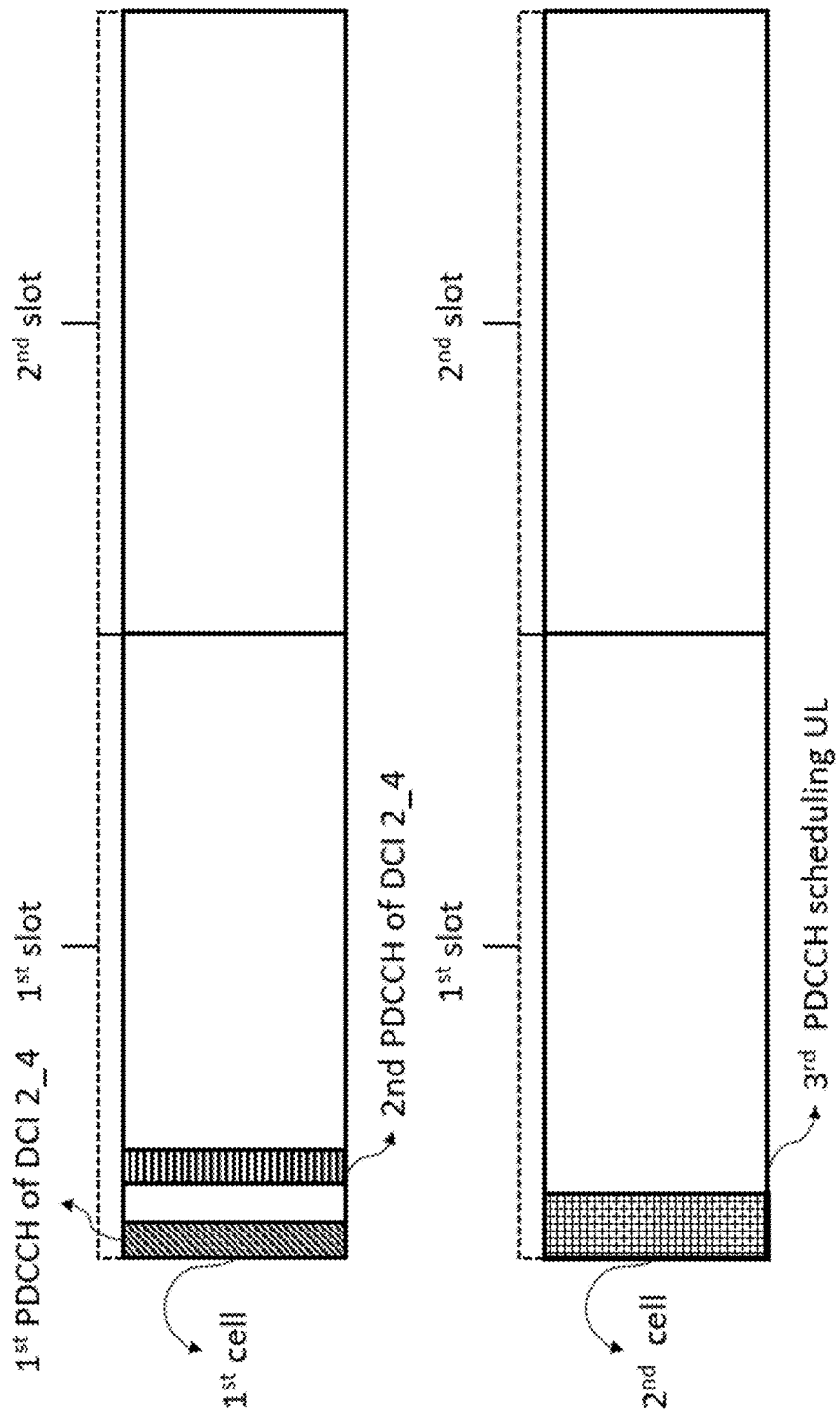
FIG. 22 is a diagram according to one exemplary embodiment.

For example, as shown in FIG. 22, the first PDCCH candidate and the second PDCCH candidate providing DCI format 2_4 could be transmitted with intra-slot PDCCH repetition; and the first PDCCH candidate and the second PDCCH candidates could be transmitted within first three symbol of a slot in a cell. The third PDCCH candidate providing DCI scheduling a UL transmission could be transmitted in a slot of another cell. The first PDCCH candidate could be transmitted in first symbol of first slot in first cell. The second PDCCH candidate could be transmitted in third symbol of first slot in first cell. The third PDCCH candidate could be transmitted in 1st and 2nd symbol of first slot in second cell. Subcarrier spacing of first cell and second cell are identical. As the last symbol of third PDCCH candidate is earlier than the first symbol of second PDCCH candidate and is not earlier than first symbol of first PDCCH candidate, applicability of indication of DCI format 2_4 to UL transmission scheduled by third PDCCH candidate could uncertain.

Figure 23:
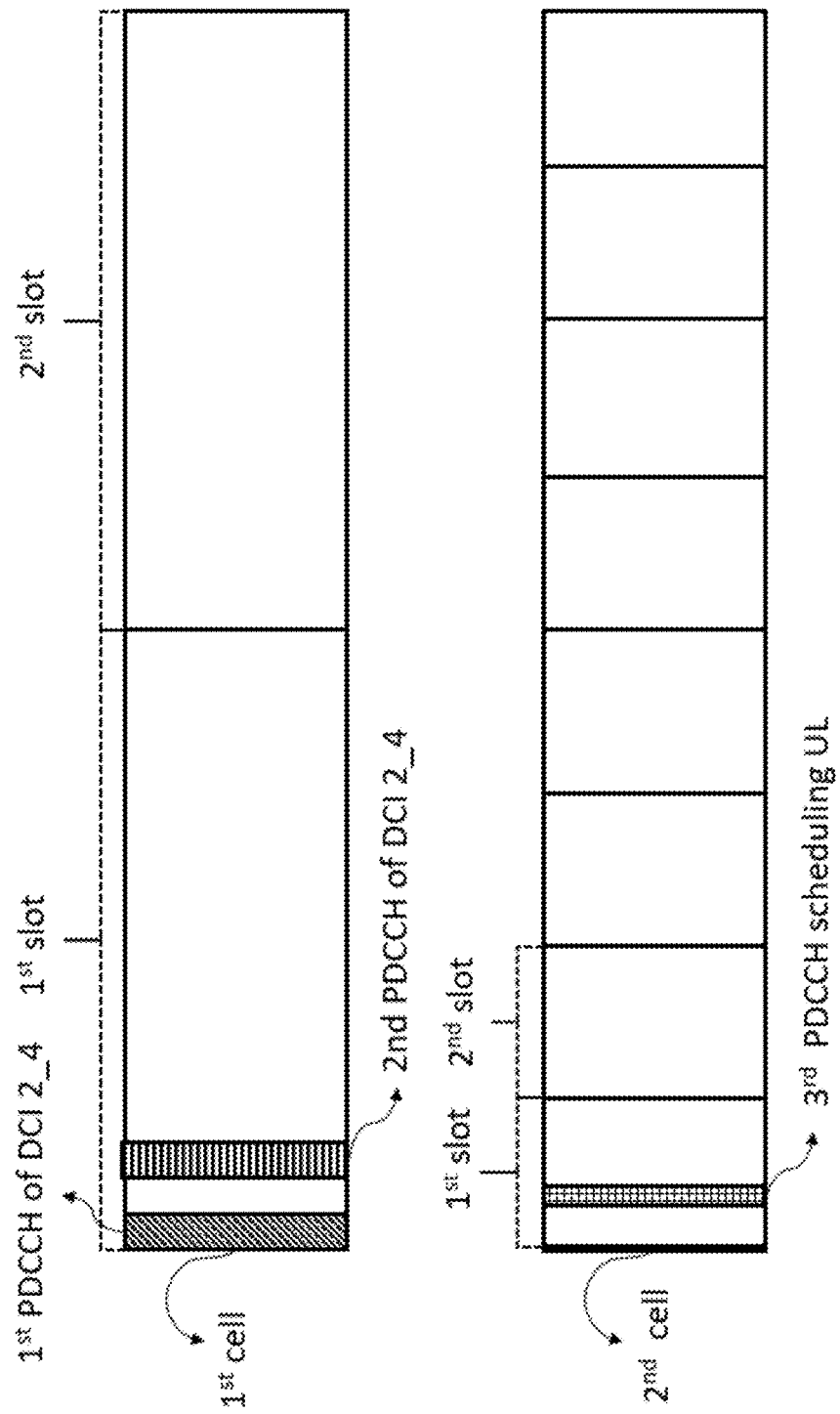
FIG. 23 is a diagram according to one exemplary embodiment.

For example, as shown in FIG. 23, the first PDCCH candidate and the second PDCCH candidate providing DCI format 2_4 could be transmitted with intra-slot PDCCH repetition; and the first PDCCH candidate and the second PDCCH candidates could be transmitted within first three symbol of a slot in a cell. The third PDCCH candidate providing DCI scheduling a UL transmission could be transmitted in a slot of another cell. The first PDCCH candidate could be transmitted in first symbol of first slot in first cell. The second PDCCH candidate could be transmitted in third symbol of first slot in first cell. The third PDCCH candidate could be transmitted in 4th and 5th symbol of first slot in second cell. Subcarrier spacing of first cell and second cell could be 15 kHz and 30 kHz respectively. In one embodiment, subcarrier spacing of active UL BWP of first cell could be different than subcarrier spacing of active UL BWP of second cell since DCI format 2_4 could indicate ULCI for first cell and second cell (e.g., cross-cell/carrier indication). As the last symbol of third PDCCH candidate is earlier than first symbol of second PDCCH candidate and is not earlier than first symbol of first PDCCH candidate, applicability of indication of DCI format 2_4 to UL transmission scheduled by third PDCCH candidate could be uncertain.

UE may receive PDCCH candidate providing DCI format 2_4 with PDCCH repetition and PDCCH candidate providing DCI scheduling UL transmission. UE may receive first PDCCH candidate and second PDCCH candidate with PDCCH repetition and third PDCCH candidate. The first PDCCH candidate and the second PDCCH candidate could provide DCI format 2_4. The first PDCCH candidate and the second PDCCH candidate may be associated/linked with each other. ULCI provided by DCI format 2_4 in first PDCCH candidate may at least provide partially or fully overlapping information as ULCI provided by DCI format 2_4 in second PDCCH candidate. In one embodiment, ULCI indicated by DCI format 2_4 in first PDCCH candidate could indicate the same information as ULCI indicated by DCI format 2_4 in second PDCCH candidate. UE may receive configuration of monitoring PDCCH candidate in first CSS, second CSS, and first USS. The first PDCCH candidate may be associated with first CSS. Second PDCCH candidate may be associated with second CSS.

In one embodiment, first CORESET may be associated with first CSS. Second CORESET may be associated with second CSS. The third PDCCH candidate could provide DCI scheduling UL transmission. The third PDCCH candidate may be associated with first USS. The third CORESET may be associated with first USS.

In one embodiment, UE may receive first PDCCH candidate, second PDCCH candidate, and third PDCCH candidate within first three symbols of a slot. UE may receive first PDCCH candidate, second PDCCH candidate, and third PDCCH candidate in a slot. UE may receive first PDCCH candidate within first three symbols of first slot, may receive second PDCCH candidate within first three symbol in second slot, and may receive third PDCCH candidate in first slot or second slot. UE may receive first PDCCH candidate and second PDCCH candidate within first three symbols of a slot in first serving cell, and may receive third PDCCH candidate in a slot in second serving cell.

In one embodiment, UE may receive first PDCCH candidate being earlier than second PDCCH candidate in time. UE may receive first PDCCH candidate being earlier than third PDCCH candidate. UE may receive second PDCCH candidate being later than third PDCCH candidate. The first PDCCH candidate and the second PDCCH candidate may not be overlap in time. The first PDCCH candidate may overlap in time with the third PDCCH candidate. The second PDCCH candidate may overlap in time with the third PDCCH candidate. The last symbol of the third PDCCH candidate may be earlier than the first symbol of the second PDCCH candidate. The last symbol of third PDCCH candidate may not be earlier than first symbol of first PDCCH candidate. In one embodiment, the first PDCCH candidate and the second PDCCH candidate may be in first serving cell. The third candidate PDCCH may be in second serving cell.

In one embodiment, for first PDCCH candidate and second PDCCH candidate being linked and providing DCI format 2_4, the UE could determine a reference PDCCH candidate based on later PDCCH candidate among the first and second PDCCH candidate in time domain. More specifically, later PDCCH candidate could mean first or second PDCCH candidate with later ending (OFDM) symbol. Alternatively, later PDCCH candidate could mean first or second PDCCH candidate with later starting (OFDM) symbol (e.g., later first OFDM symbol of PDCCH candidate).

In one embodiment, for first PDCCH candidate and second PDCCH candidate being linked and providing DCI format 2_4, the UE could determine a reference PDCCH candidate based on earlier PDCCH candidate among the first and second PDCCH candidate in time domain. More specifically, earlier PDCCH candidate could mean first or second PDCCH candidate with earlier ending (OFDM) symbol. Alternatively, earlier PDCCH candidate could mean first or second PDCCH candidate with earlier starting (OFDM) symbol (e.g., later first OFDM symbol of PDCCH candidate).

In one embodiment, for first PDCCH candidate and second PDCCH candidate being linked and providing DCI format 2_4, the UE could determine whether ULCI for a serving cell is applicable to a PUSCH transmission or an SRS transmission on the serving cell based on the reference PDCCH candidate.

In one embodiment, an indication by a DCI format 2_4 for a serving cell may be applicable to a PUSCH transmission or an SRS transmission on the serving cell. If the PUSCH transmission or the SRS transmission is scheduled by a DCI, the indication by the DCI format 2_4 may be applicable to the PUSCH transmission or SRS transmission if last symbol of the PDCCH reception providing the DCI is earlier than the first symbol of the first PDCCH candidate in PDCCH repetition providing the DCI format 2_4 which may be the earlier DCI format 2_4 in time among DCI format 2_4 repetition.

In one embodiment, UE may receive an indication providing ULCI by first PDCCH candidate and second PDCCH candidate with PDCCH repetition. An indication by first PDCCH candidate and second PDCCH candidate providing DCI format 2_4 for a serving cell may be applicable to a PUSCH transmission or an SRS transmission on the serving cell. If UE receives a PUSCH transmission or the SRS transmission by third PDCCH candidate providing DCI scheduling UL transmission, the indication by first PDCCH candidate and second PDCCH candidate is applicable to the PUSCH transmission or SRS transmission scheduled by third PDCCH candidate if UE receives first PDCCH candidate and third PDCCH candidate such that last symbol of third PDCCH candidate is received earlier than first symbol of first PDCCH candidate or if UE receives first PDCCH candidate and third PDCCH candidate such that last symbol of third PDCCH candidate is received earlier than first symbol of second PDCCH candidate.

Figure 24:
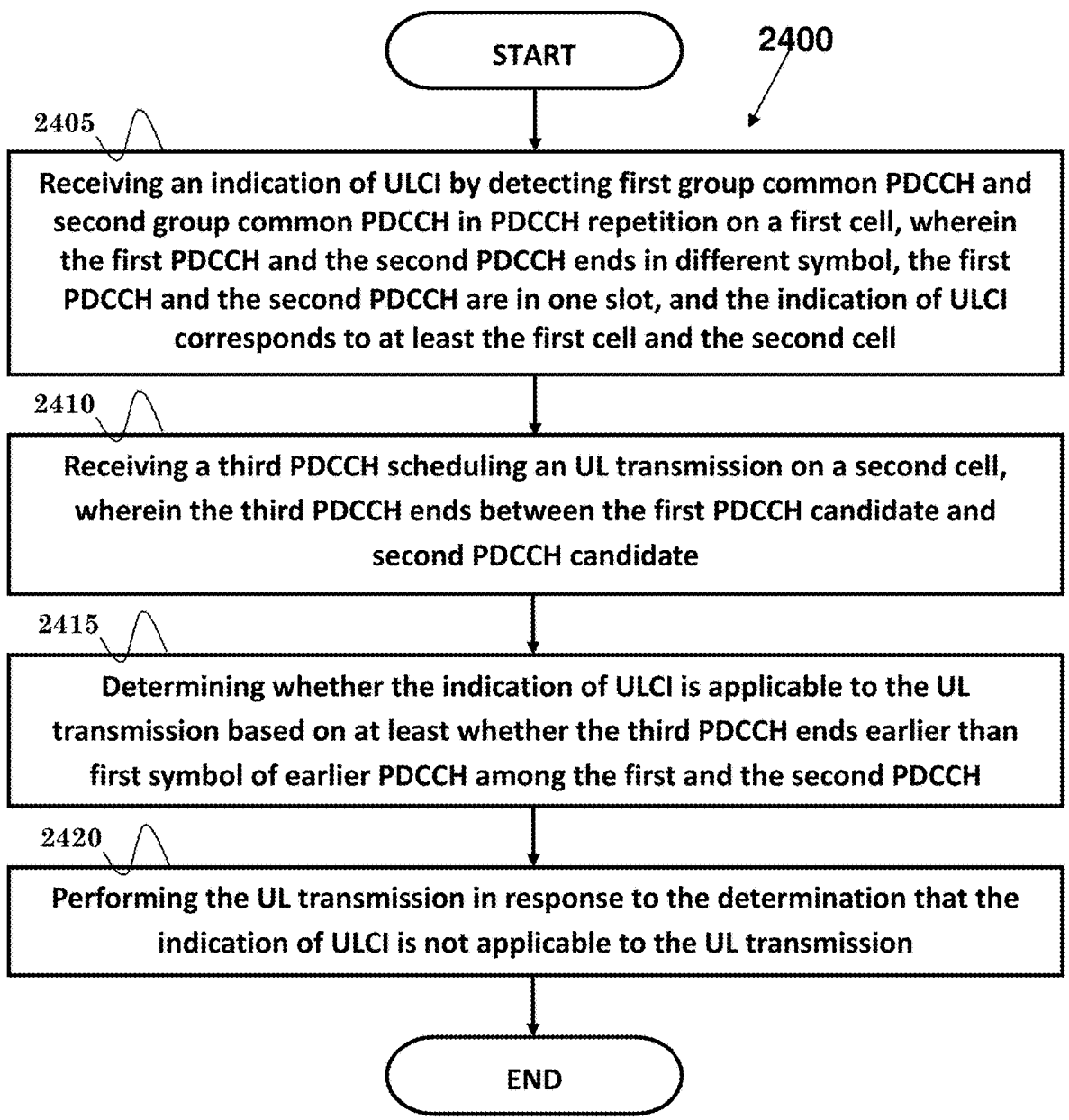
FIG. 24 is a flow chart according to one exemplary embodiment.

FIG. 24 is a flow chart 2400 according to one exemplary embodiment from the perspective of a UE. In step 2405, the UE receives an indication of Uplink Cancelation Indication (ULCI) by detecting first group common PDCCH and second group common PDCCH in PDCCH repetition on a first cell, wherein the first PDCCH and the second PDCCH ends in different symbol, the first PDCCH and the second PDCCH are in one slot, and the indication of ULCI corresponds to at least the first cell and the second cell. In step 2410, the UE receives a third PDCCH scheduling an UL transmission on a second cell, wherein the third PDCCH ends between the first PDCCH candidate and second PDCCH candidate. In step 2415, the UE determines whether the indication of ULCI is applicable to the UL transmission based on at least whether the third PDCCH ends earlier than first symbol of earlier PDCCH among the first and the second PDCCH. In step 2420, the UE performs the UL transmission in response to the determination that the indication of ULCI is not applicable to the UL transmission.

In one embodiment, the first PDCCH could be associated to or could provide DCI format 2_4. The second PDCCH could be associated to or could provide DCI format 2_4. The first PDCCH and the second PDCCH could be associated or linked with each other. In one embodiment, both the first and the second PDCCH could end in first three symbols of a slot.

In one embodiment, the first PDCCH could be associated with a type-3 Common Search Space (CSS). The second PDCCH could be associated with a type-3 CSS. The third PDCCH could provide DCI format scheduling the UL transmission. The third PDCCH could be associated with UE-specific Search Space (USS).

In one embodiment, the UL transmission may be PUSCH transmission or SRS transmission. The Subcarrier Spacing (SCS) of active Bandwidth Part (BWP) of the first cell could be different than SCS of active BWP of the second cell.

Referring back to FIGS. 3 and 4, in one exemplary embodiment of a UE. The UE 300 includes a program code 312 stored in the memory 310. The CPU 308 could execute program code 312 to enable the UE (i) to receive an indication of ULCI by detecting first group common PDCCH and second group common PDCCH in PDCCH repetition on a first cell, wherein the first PDCCH and the second PDCCH ends in different symbol, the first PDCCH and the second PDCCH are in one slot, and the indication of ULCI corresponds to at least the first cell and the second cell, (ii) to receive a third PDCCH scheduling an UL transmission on a second cell, wherein the third PDCCH ends between the first PDCCH candidate and second PDCCH candidate, (iii) to determine whether the indication of ULCI is applicable to the UL transmission based on at least whether the third PDCCH ends earlier than first symbol of earlier PDCCH among the first and the second PDCCH, and (iv) to perform the UL transmission in response to the determination that the indication of ULCI is not applicable to the UL transmission. Furthermore, the CPU 308 can execute the program code 312 to perform all of the above-described actions and steps or others described herein.

Any combination of above concepts can be jointly combined or formed to a new embodiment. The following embodiments can be used to solve at least (but not limited to) the issue mentioned above.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network, comprising:
transmitting a Semi-Persistent Scheduling (SPS) configuration to a User Equipment (UE) for configuring a second Physical Downlink Shared Channel (PDSCH);
transmitting a configuration to the UE for configuring a first monitoring occasion for a first Physical Downlink Control Channel (PDCCH) and a second monitoring occasion for a second PDCCH, wherein the second PDCCH is associated with the first PDCCH; and
not allowing the first PDCCH and the second PDCCH to schedule the UE with a first PDSCH partially or fully overlapping with the second PDSCH in time domain, wherein a last symbol of a later monitoring occasion among the first and the second monitoring occasion ends less than a processing threshold before a starting symbol of the second PDSCH.

2. The method of claim 1, wherein the network does not transmit the second PDSCH when the last symbol of the later monitoring occasion among the first and the second monitoring occasion ends at least by the processing threshold before the starting symbol of the second PDSCH.

3. The method of claim 1, wherein the first monitoring occasion and the second monitoring occasion are earlier than the second PDSCH.

4. The method of claim 1, wherein the processing threshold is 14 Orthogonal Frequency Division Multiplexing (OFDM) symbols, and/or the processing threshold is associated with receiving and/or decoding PDCCH, and/or the processing threshold is fixed.

5. The method of claim 1, wherein the later monitoring occasion among the first and the second monitoring occasion corresponds to a monitoring occasion which ends later than another monitoring occasion among the first and the second monitoring occasion.

6. The method of claim 1, wherein the network transmits the first PDCCH via a first beam or with a first Quasi-Colocation (QCL) assumption to a first Reference Signal (RS), and/or
the network transmits the second PDCCH via a second beam or with a second QCL assumption to a second RS, and/or
the first RS is the same or different from the second RS.

7. The method of claim 1, wherein the first PDSCH is scrambled or associated with Cell Radio Network Temporary Identifier (C-RNTI), Configured Scheduling Radio Network Temporary Identifier (CS-RNTI), or Modulation and Coding Scheme Radio Network Temporary Identifier (MCS-C-RNTI), and/or
the first PDCCH is scrambled or associated with C-RNTI or MCS-C-RNTI, and/or
the second PDCCH is scrambled or associated with C-RNTI or MCS-C-RNTI, and/or
the first PDCCH delivers or carries a Downlink Control Information (DCI) with same scheduling information as DCI delivered or carried by the second PDCCH.

8. The method of claim 1, wherein the second PDSCH is not scheduled by a third PDCCH or there is no dynamic scheduling PDCCH for the second PDSCH.

9. The method of claim 1, when only an earlier monitoring occasion among the first and the second PDCCH monitoring occasion ends at least by the processing threshold before a starting symbol of the second PDSCH, the network is not allowed to transmit the first PDSCH partially or fully overlapping with the second PDSCH in time domain.

10. A method for a User Equipment (UE), comprising:
receiving a Semi-Persistent Scheduling (SPS) configuration, from a network, for configuring a second Physical Downlink Shared Channel (PDSCH);
receiving a configuration, from the network, for configuring a first monitoring occasion for a first Physical Downlink Control Channel (PDCCH) and a second monitoring occasion for a second PDCCH, wherein the second PDCCH is associated to the first PDCCH; and
receiving or decoding a first PDSCH, scheduled by the first PDCCH and the second PDCCH, when a last symbol of a later monitoring occasion among the first and the second monitoring occasion ends at least by a processing threshold before a starting symbol of the second PDSCH, wherein the first PDSCH partially or fully overlap with the second PDSCH in time domain.

11. The method of claim 10, wherein the UE does not receive or decode the second PDSCH and/or receives or decodes the first PDSCH when the last symbol of the later monitoring occasion among the first and the second monitoring occasion ends at least by the processing threshold before the starting symbol of the second PDSCH.

12. The method of claim 10, wherein the UE does not receive or decode the first PDSCH and/or receives or decodes the second PDSCH when the last symbol of the later monitoring occasion among the first and the second monitoring occasion does not end at least by the processing threshold before the starting symbol of the second PDSCH.

13. The method of claim 10, wherein the UE does not receive or decode the first PDSCH and/or receives or decodes the second PDSCH when only the first monitoring occasion ends at least by the processing threshold before the starting symbol of the second PDSCH.

14. The method of claim 10, wherein the first monitoring occasion and the second monitoring occasion are earlier than the second PDSCH.

15. The method of claim 10, the processing threshold is 14 Orthogonal Frequency Division Multiplexing (OFDM) symbols, and/or
   the processing threshold is associated with PDCCH receiving and/or decoding, and/or
   the processing threshold is fixed.

16. The method of claim 10, wherein the later monitoring occasion among the first and the second monitoring occasion corresponds to a monitoring occasion which ends later than another monitoring occasion among the first and the second monitoring occasion.

17. The method of claim 10, the UE receives the first PDCCH via a first beam or with a first Quasi-Colocation (QCL) to a first Reference Signal (RS), and/or
   the UE receives the second PDCCH via a second beam or with a second QCL assumption to a second RS, and/or
   the first RS is the same or different from the second RS.

18. The method of claim 10, wherein the first PDSCH is scrambled or associated with Cell Radio Network Temporary Identifier (C-RNTI), Configured Scheduling Radio Network Temporary Identifier (CS-RNTI), or Modulation and Coding Scheme Radio Network Temporary Identifier (MCS-C-RNTI), and/or
   the first PDCCH is scrambled or associated with C-RNTI or MCS-C-RNTI, and/or
   the second PDCCH is scrambled or associated with C-RNTI or MCS-C-RNTI, and/or
   the first PDCCH delivers or carries a Downlink Control Information (DCI) with same scheduling information as DCI delivered or carried by the second PDCCH.

19. The method of claim 10, wherein the second PDSCH is not scheduled by a third PDCCH, or wherein there is no dynamic scheduling PDCCH for the second PDSCH.

20. A network, comprising:
   a control circuit;
   a processor installed in the control circuit; and
   a memory installed in the control circuit and operatively coupled to the processor;
   wherein the processor is configured to execute a program code stored in the memory to:
      transmit a Semi-Persistent Scheduling (SPS) configuration to a User Equipment (UE) for configuring a second Physical Downlink Shared Channel (PDSCH);
      transmit a configuration to the UE for configuring a first monitoring occasion for a first Physical Downlink Control Channel (PDCCH) and a second monitoring occasion for a second PDCCH, wherein the second PDCCH is associated with the first PDCCH; and
      not allow the first PDCCH and the second PDCCH to schedule the UE with a first PDSCH partially or fully overlapping with the second PDSCH in time domain, wherein a last symbol of a later monitoring occasion among the first and the second monitoring occasion ends less than a processing threshold before a starting symbol of the second PDSCH.

* * * * *